(12) United States Patent
Watanabe et al.

(10) Patent No.: US 6,785,791 B2
(45) Date of Patent: Aug. 31, 2004

(54) METHOD FOR ACCESSING DATA BEING COPIED BETWEEN DATA REGIONS BEFORE THE COPYING IS COMPLETED

(75) Inventors: Futoshi Watanabe, Kawasaki (JP); Yasuhiro Onda, Yokohama (JP); Hidejiro Daikokuya, Kawasaki (JP); Mikio Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 142 days.

(21) Appl. No.: 09/984,733

(22) Filed: Oct. 31, 2001

(65) Prior Publication Data

US 2002/0144070 A1 Oct. 3, 2002

(30) Foreign Application Priority Data

Mar. 29, 2001  (JP) ........................................ 2001-097344

(51) Int. Cl.[7] .............................................. G06F 13/08
(52) U.S. Cl. ...................................... 711/165; 711/154
(58) Field of Search .................................. 711/154, 165

(56) References Cited

U.S. PATENT DOCUMENTS

| | | | |
|---|---|---|---|
| 5,263,154 A | 11/1993 | Eastridge et al. | ............... 714/6 |
| 5,379,398 A | 1/1995 | Cohn et al. | .................. 711/154 |
| 5,379,412 A | 1/1995 | Eastridge et al. | ........... 711/162 |
| 5,809,332 A | 9/1998 | Vishlitzky et al. | ............. 710/5 |
| 5,881,287 A * | 3/1999 | Mast | ........................... 717/127 |
| 5,966,733 A * | 10/1999 | Brewer | ....................... 711/170 |
| 6,128,699 A * | 10/2000 | Golding | ....................... 711/112 |
| 2002/0144076 A1 * | 10/2002 | Yamamoto et al. | ......... 711/202 |

FOREIGN PATENT DOCUMENTS

| | | |
|---|---|---|
| JP | 5-210555 | 8/1993 |
| JP | 08-166909 | 6/1996 |
| JP | 11-305949 | 11/1999 |
| JP | 2001-502080 | 2/2001 |
| JP | 2001-166974 | 6/2001 |
| WO | WO 93/08529 | 4/1993 |
| WO | WO 97/46945 | 12/1997 |

OTHER PUBLICATIONS

U.S. patent application Ser. No. 09/534,113, Kaiya et al., filed Mar. 23, 2000.

* cited by examiner

Primary Examiner—Reba I. Elmore
(74) Attorney, Agent, or Firm—Staas & Halsey LLP

(57) ABSTRACT

A processing method for copying between storage device data regions and a memory system are provided to allow immediate access in a state of having completed copying in response to a copy instruction, even when actual data is being copied in a remote system, thus preventing a decrease in the performance of the access to the copy source during copying. Processes include copying data in a data region of a copy source to an intermediate media data region for each prescribed block unit in response to a copy instruction, as well as copying the data copied to the intermediate media data region to a copy destination data region. Processes also include interrupting copying and processing an access when there is an external access for a block of the copy source or the copy destination data region during the copy processing.

20 Claims, 22 Drawing Sheets

BLOCK DIAGRAM

ACCESS PATTERNS

| ACCESS PATTERN | ACCESS TARGET LOGICAL DISK | ACTUAL COPY STATE | I/O ACCESS TYPE |
|---|---|---|---|
| PATTERN 1 | COPY SOURCE LOGICAL DISK | COMPLETE | REFERENCE |
| PATTERN 2 | COPY SOURCE LOGICAL DISK | COMPLETE | UPDATE |
| PATTERN 3 | COPY SOURCE LOGICAL DISK | INCOMPLETE | REFERENCE |
| PATTERN 4 | COPY SOURCE LOGICAL DISK | INCOMPLETE | UPDATE |
| PATTERN 5 | COPY DESTINATION LOGICAL DISK | COMPLETE | REFERENCE |
| PATTERN 6 | COPY DESTINATION LOGICAL DISK | COMPLETE | UPDATE |
| PATTERN 7 | COPY DESTINATION LOGICAL DISK | INCOMPLETE | REFERENCE |
| PATTERN 8 | COPY DESTINATION LOGICAL DISK | INCOMPLETE | UPDATE |
| PATTERN 9 | INTERMEDIATE LOGICAL DISK | COMPLETE | REFERENCE |
| PATTERN 10 | INTERMEDIATE LOGICAL DISK | COMPLETE | UPDATE |
| PATTERN 11 | INTERMEDIATE LOGICAL DISK | INCOMPLETE | REFERENCE |
| PATTERN 12 | INTERMEDIATE LOGICAL DISK | INCOMPLETE | UPDATE |

FIG. 6

METHOD FOR ACCESSING DATA BEING COPIED BETWEEN DATA REGIONS BEFORE THE COPYING IS COMPLETED

CROSS-REFERENCE TO RELATED APPLICATIONS

This application is related to, and claims the benefit of priority to, Japanese Patent Application number 2001-097344, filed Mar. 29, 2001 in Japan, the contents of which are incorporated herein by reference.

BACKGROUND OF THE INVENTION

1. Field of the Invention

The present invention relates to a processing method for copying between data regions and a memory system for copying between logical disk and other data regions. More particularly, the present invention relates to a processing method for copying between data regions and a memory system making immediate access to a data region possible in response to an instruction to copy a data region provided in a main center to a data region provided in a supplemental center in a remote system, in which the main center and the supplemental center are disposed to communicate with a remote location.

2. Description of the Related Art

Copying of a logical disk and other data region units is executed. For example, a logical disk is an apparent disk device constructed without relation to the physical restrictions on physical disks. Accordingly, a logical disk may be constructed physically from a plurality of physical disk devices, and a plurality of logical disks may be constructed on one physical disk as well. The form that is used is determined by content and performance parameters.

Such a representative system is called a RAID (for example, RAID 0, 1, 0+1, 3 or 5) rank or a RAID group. RAID generally refers to a Redundant Arrays of Independent Disks.

Copying between physical disks in a remote system is mainly used as backup for saving data, but it is also used for various other purposes. For example, there are cases where tests are run without interrupting work. In such a case, the logical disk used in the work is copied, and the copy destination logical disk is used by the test system. Even if damage should occur to the data in the test system using the copy destination logical disk, there is thereby no effect on the work using the copy source logical disk.

Alternatively, a logical disk used in online work is copied, and the copy destination logical disk is used for batch processing. The performance of the online work using the source logical disk is thereby not affected by the batch processing.

In this manner, the number of instances where logical disk-to-disk copying is required is increasing. During the copying of the logical disks, work must be stopped. For example, it takes around 2 hours to copy 9 gigabytes (or GB). In recent environments with a 24-hour continuous operation, however, it is desired to come close to zero for the work stop time by coming close to zero for the copying time.

FIGS. 17 to 20 are explanatory diagrams of the Prior Art. FIG. 17 and FIG. 18 are explanatory diagrams of conventional separate dual volume systems. FIG. 19 is an explanatory diagram of a conventional log structure system. FIG. 20 is an explanatory diagram of a conventional concurrent copy system.

The methods below are known as logical disk data copying methods provided in conventional RAID systems.

(1) Separate Dual Volume System

In a system comprising a RAID device 91 and a host 90 as indicated in FIG. 17, when the host 90 makes an instruction to copy as indicated in FIG. 18, preparation (definition) of a copy destination volume (logical disk) 94 is executed. Next, copying to a secondary (copy destination logical disk) 94 from a primary (copy source logical disk) 93 begins (a dual state is created) in response to a dual creation start instruction. When the copying is complete (the dual status is complete), the creation of a pair is complete. When this dual status ends, an update processing request from the host 90 is reflected in the primary (copy source logical disk) 93 and the secondary (copy destination logical disk) 94. The host 90 issues a dual pair separation instruction, thereby completing the copying of the logical volume in the state at that point. As indicated in FIG. 17, separate hosts (applications) 90 and 95 can use the primary (copy source logical disk) 93 and the secondary (copy destination logical disk) 94.

As indicated in FIG. 18, the primary (copy source logical disk) 93 can be accessed even during the copy interval and the secondary (copy destination logical disk) 94 cannot be accessed during the copy interval.

(2) Log Structured File

As indicated in FIG. 19, there are logical disks A, B and C defined by the host. Each data block is stored on one physical disk 96. Each logical disk A, B and C is defined with data pointers for the physical disk 96. Accordingly, copying from the logical disk A to the logical disk B is executed by setting the pointer for the logical disk A to the pointer of the logical disk B.

Data B2 updated on the logical disk B is stored on the physical disk 96 separately from the original data. By updating the pointer for the logical disk B to the pointer for the updated data B2, the logical disk B can be updated without modifying original data A1 to A6 on the logical disk A.

This method does not accompany copying of actual data, and by setting pointers, the copy operation completes immediately.

(3) Concurrent Copy

As indicated in FIG. 20, during the copying from a copy source disk 93 to a copy destination disk 94, a host 90 reads the copy target data on a copy source disk 93 (A), and writes to a copy destination disk 94 using a data transfer function. The bitmap of the address where copying is complete is set to copy complete.

During copying, if there is an update request to an un-copied region of the copy source disk 93, that data on the copy source disk 93 is withdrawn to a side file 92 (1). The side file is set to the bitmap address portion during the withdrawal (2). Then, the copy source disk 93 is updated (3). While copying the data withdrawn to the side file 92, copy target data is read from the side file 92, and this is written to the copy destination disk 94 using a data transfer function (4). With this method, references/updates to the copy source disk 93 from the host are possible during copying.

Nevertheless, there are the following problems with the Prior Art, solved by the present invention.

(1) It is not possible to access the copy destination disk during the copy interval in the dual system in FIG. 17 and FIG. 18. Because of this, it is necessary to wait for the copying to complete to access to the copy destination disk. For example, it takes around 2 hours to copy 9 GB, so a waiting time of 2 hours occurs. Because of this, a scheduled operation is required.

(2) With the log structure system in FIG. 19, access is possible to the copy source logic disk and the copy destination logical in response to a copy instruction, but because the actual data is not copied, the advantage of a dual system with the data copied onto a separate system is not gained. More specifically, damage to the copy destination logical disk is also damage to the copy source logical disk, so if damage occurs to the copy destination physical disk, the copy source logical disc cannot be used either. Also, access to the copy destination physical disk is access to the copy source physical disk, so high speed performance through a distribution to separate disks is not obtained.

(3) With the concurrent copy system in FIG. 20, access to the copy source logical disk is possible during copying, but it is necessary to wait until copying completes to access the copy destination logical disk.

A similar problem is that to allow access from a host device, logical disk formatting was required beforehand, and until the formatting ended, access could not be made to the logical disk. The time required for the logical formatting differs according to the size of the logical volume, but it takes roughly tens of minutes to a number of hours, and during this period, data cannot be processed. With the current state of things, the time required for operations such as new installation of storage systems and increasing the logical volume of existing systems cannot be ignored.

SUMMARY OF THE INVENTION

Accordingly, an aspect of the present invention is to offer a processing method for copying between storage device data regions and a storage system such that even when actual data is copied, access is possible in a state where the copying completes immediately in response to a copy instruction.

Another aspect of the present invention is to offer a processing method for copying between storage device data regions and a storage system to allow access to a copy destination data region even during copying.

Yet another aspect of the present invention is to offer a processing method for copying between storage device data regions and a storage system to determine whether copying of an access region is complete or not, and to allow access to the copy destination data region.

A further aspect of the present invention is to offer a storage device formatting processing method, a storage system and a storage media therefore such that access is possible in a state where formatting has completed immediately in response to a format start instruction even when logical disk formatting is being executed.

The present invention solves the above-mentioned problems of the related art.

The present invention is a processing method for copying between storage device data regions for copying data in a copy source data region to a copy destination data region in response to a copy instruction. The copy method has a process for copying data in the aforementioned copy source data region to an intermediate media data region for each prescribed block unit as well as copying the data copied to the intermediate media data region to the aforementioned copy destination data region in response to a copy instruction, and a process for interrupting the aforementioned copy processing for an external access to a block in the aforementioned copy source or the aforementioned copy destination data region during the aforementioned copy processing and for processing the aforementioned access.

After determining whether the copy processing is complete for the aforementioned access target block for each region, the access processing process has the below processing processes based on that determination.

If the access is for updating a block for which copying of the copy source data region is incomplete, data stored in an access target block in the copy source data region is copied to the intermediate media data region after which the aforementioned access target block in the copy source data region is updated.

If the access is for referencing a block for which copying of the data to an intermediate media data region from a copy source data region is incomplete and for which copying to the copy destination data region is incomplete, the data in the copy source data region is referenced.

If the access is for referencing a block for which copying of data in an intermediate data region from a copy source data region is complete and for which copying to the copy destination data region is incomplete, the data in the intermediate media data region or the data in the copy source data region is referenced. When considering the processing performance of the device, the latter is generally desired, but the relative merits of the specific performance differs depending on various factors such as the existence of data in cache memory.

If access is for updating a block for which copying of data to an intermediate media data region from a copy source data region is incomplete and for which copying to the copy destination data region is incomplete, processing occurs in either one of the two ways below.

The first processing is to prohibit updating the access target block of the copy destination data region and copying to that block. The second processing is to prohibit copying from the copy source data region to the block storing data after that data in an intermediate media data region is updated.

Updating the access target block in the copy destination data region and copying to that block is prohibited if the access is for updating a block for which copying to an intermediate media data region from a copy source data region is complete and for which copying of the copy destination data region is incomplete.

With the present invention, a response of copy completion is returned immediately in response to a copy instruction, and while copying actual data, referencing and updating access to the copy source and copy destination data regions are carried out when an access request is received. Because of this, first, the copy source data region is divided into a plurality of blocks, and after copying to the intermediate media data region by divided block unit, the data is copied to the copy destination data region. If there is an access request during copying, the copy operation is interrupted and the access request is executed. The reason for providing the intermediate media is described below.

Copying from a copy source to intermediate media and copying from intermediate media to a copy destination can be executed at different times or simultaneously. The choice is determined in a trade-off between processing time and development time.

Second, the access processing changes depending on whether the access target region is a copy complete region or a copy incomplete region, and whether copying to the intermediate media is complete or not. More specifically, with reference and update access to a copy complete region, the copying is complete, so access is allowed. For access to a copy incomplete region, on the other hand, the data at the time of the copy instruction is saved while access is allowed. More specifically, for a reference access to a copy incomplete region in the copy source data region, the data is not modified, so the access is allowed directly. With an update access to a copy incomplete region in a copy source data region, a direct update causes data uncopied before the update to be lost. Because of this, the access target region of the copy source data region is copied to the copy destination data region, moving data before the update to the copy destination data region. After this, the access target region in the copy source data region is updated. Logically, then, data before the update can thereby be copied at the time of the copy instruction.

However, with a remote system making data redundant through a communication line with a main center and a secondary center disposed in remote locations, the aforementioned procedure cannot be applied without modification. This is because in a remote system, four times the time is required for transfer of data between a main center and a supplemental center compared to data transfer processing between storage devices within the same storage system. This is due to instances with a distance between the main center and supplemental system of hundreds of kilometers and to the use of general dedicated lines, etc., for communication.

Thus, when an update to a copy incomplete block in a copy source data region is processed during data copying, an operation to copy that block to the secondary center is required. Until that copy processing is complete, the update processing from the host device for the copy incomplete block in the copy source data region is caused to wait. Update processing from the host device becomes considerably delayed, and the system performance is greatly decreased.

Because of this, an intermediate media is required particularly for remote systems. When data copying from the main center to the supplemental center begins, first, copying from the copy source data region to the intermediate media data region begins. The copying is executed inside a single storage system, so even if updating of a copy incomplete block in the copy source data region such as described above is carried out during copying, copying of the block to the intermediate media will end in a comparatively short time. Because of this, the decrease in system performance is kept to a minimum, within a range that is ordinarily not a problem.

Once the copying from the copy source data region to the intermediate media region is complete, the copy source data region is released from the copy processing. Access to the copy source data region by the host device is carried out as normal. A decrease in performance for the copy source data region does not occur. Afterwards, the copy processing itself completes by executing the copying from the intermediate media to a copy destination region in the supplemental center. Copying from the copy source data region in the main center to the copy destination data region in the supplemental center is thereby physically completed.

Because the copying is not complete with an access referencing a copy incomplete block on the copy source data region logical disk, the data in that block of the copy source data region is read. Even if the block is a copy incomplete block in the copy destination data region, reference to that copy data in that region can be made, and even in a copy destination data region, it is possible to reference to data at the time of a copy instruction. If copying to the intermediate media is already complete, the data in that block of the intermediate media data region may be read.

An access for updating a copy incomplete region in a copy destination data region updates the copy destination data region with updated data. Copying of that region is then prohibited. The updated data of that region in the copy destination data region is thereby prevented from being altered through copying.

Even in this case, the aforementioned intermediate media is provided, so updating of the data block in the intermediate media region is more complete. In this case, copying of the block from the copy source data region to the intermediate media is prohibited.

In another mode of the present invention, copying between logical disks in a RAID system can be readily performed by constructing the aforementioned data region with logical disks. In yet another mode of the present invention, the aforementioned access processing process has a process for referencing the aforementioned access target region in the aforementioned copy source data region for a reference access to the aforementioned copy source data region, and a process to reference or update the aforementioned access target region in the aforementioned copy destination data region.

In yet another mode of the present invention, a process for referencing a copy incomplete region in the aforementioned copy destination data region comprises a process for copying the aforementioned access target region in the aforementioned referenced copy source data region to the aforementioned copy destination data region after referencing the aforementioned access target region in the aforementioned copy source data region. Referencing as well as copying is thereby made possible.

As an intermediate media is provided, when copying is complete to regions where the middle is difficult, that data can of course be referenced.

In another mode of the present invention, the aforementioned copy process has a process for referencing control information indicating the copy status of each of the aforementioned regions and determining the next copy region, and a process for updating control information in the aforementioned copy region when the copying in the aforementioned copy region is complete. The aforementioned access process has a process to reference the aforementioned control information and determine whether the aforementioned access target region is a copy complete region or a copy incomplete region.

Control information is provided, so even if data in the access target region is copied beforehand, re-copying of that region can be prevented. The control information is used to determine whether the access target region is a copy complete region or a copy incomplete region, so it is possible to accurately determine whether the access region is a copy complete region or a copy incomplete region.

In another mode of the present invention, the aforementioned access process has yet another process for updating control information for the aforementioned access target region when the aforementioned access target region in the aforementioned copy source data region is copied to the aforementioned copy destination data region. Using access processing, the control information thereby accurately indicates the copy status even if copying is carried out beforehand.

In another mode of the present invention, the aforementioned copy process has a process for referencing the aforementioned control information indicating the copy status of each of the aforementioned copy source data regions and determining the next copy region, a process for reading the target region in the aforementioned copy source data region into memory, a process to update the aforementioned control information after reading the aforementioned target region, and a process to write the aforementioned target region in the aforementioned memory into the aforementioned copy destination data region. By reading the target region into memory, and updating the control information, access to the copy source logical disk is enabled.

In another mode of the present invention, the aforementioned copy process has a process for referencing a bitmap indicated with a flag which indicates the copy status of each of the aforementioned regions and determining the next copy region, and a process for updating the flag in the aforementioned copy region in the aforementioned bitmap when copying of the aforementioned copy region completes. The control information is expressed in a bitmap, so it is possible to decrease the memory region occupied by the control information.

In another mode of the present invention, the aforementioned copy process has yet another process for copy completion notification in response to the aforementioned copy instruction. The access source thereby knows immediately that access is possible.

A disk storage system of the present invention has a logical disk comprising a physical disk, another logical disk comprising another physical disk, and an access control circuit for accessing specified logical disk data in response to an access instruction, and for copying to the aforementioned copy destination logical disk for each region unit divided on the copy source logical disk in response to a copy instruction.

The disk control circuit updates the aforementioned access target region on the aforementioned copy source logical disk after copying the aforementioned access target region on the aforementioned copy source logical disk to the aforementioned intermediate media for an access for updating a copy incomplete region on the aforementioned copy source logical disk, reads the aforementioned access target region on the aforementioned copy source logical disk for an access for referencing the copy incomplete region on the aforementioned copy destination logical disk, updates the aforementioned access target region on the aforementioned copy destination logical disk for an access for updating the copy incomplete region on the aforementioned copy destination logical disk, and prohibits copying of the aforementioned access target region.

As described above, access to the copy destination and copy source logical disks is thereby enabled during copying, and the host can immediately access the copy destination and copy source logical disks in response to a copy instruction. Accordingly, waiting for copying can be avoided.

It is possible to prevent a decrease in the processing performance of a copy source disk device in a remote system as well by providing an intermediate media.

Another mode of a disk storage system of the present invention has a memory to store control information indicating the copy status of each of the aforementioned regions on the aforementioned copy source logical disks, and the aforementioned control circuit references the control information in the aforementioned memory to determine whether the aforementioned access target region is a copy complete region or a copy incomplete region.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is an explanatory diagram for access patterns during copying.

DETAILED DESCRIPTION OF THE PREFERRED EMBODIMENTS

Figure 1:
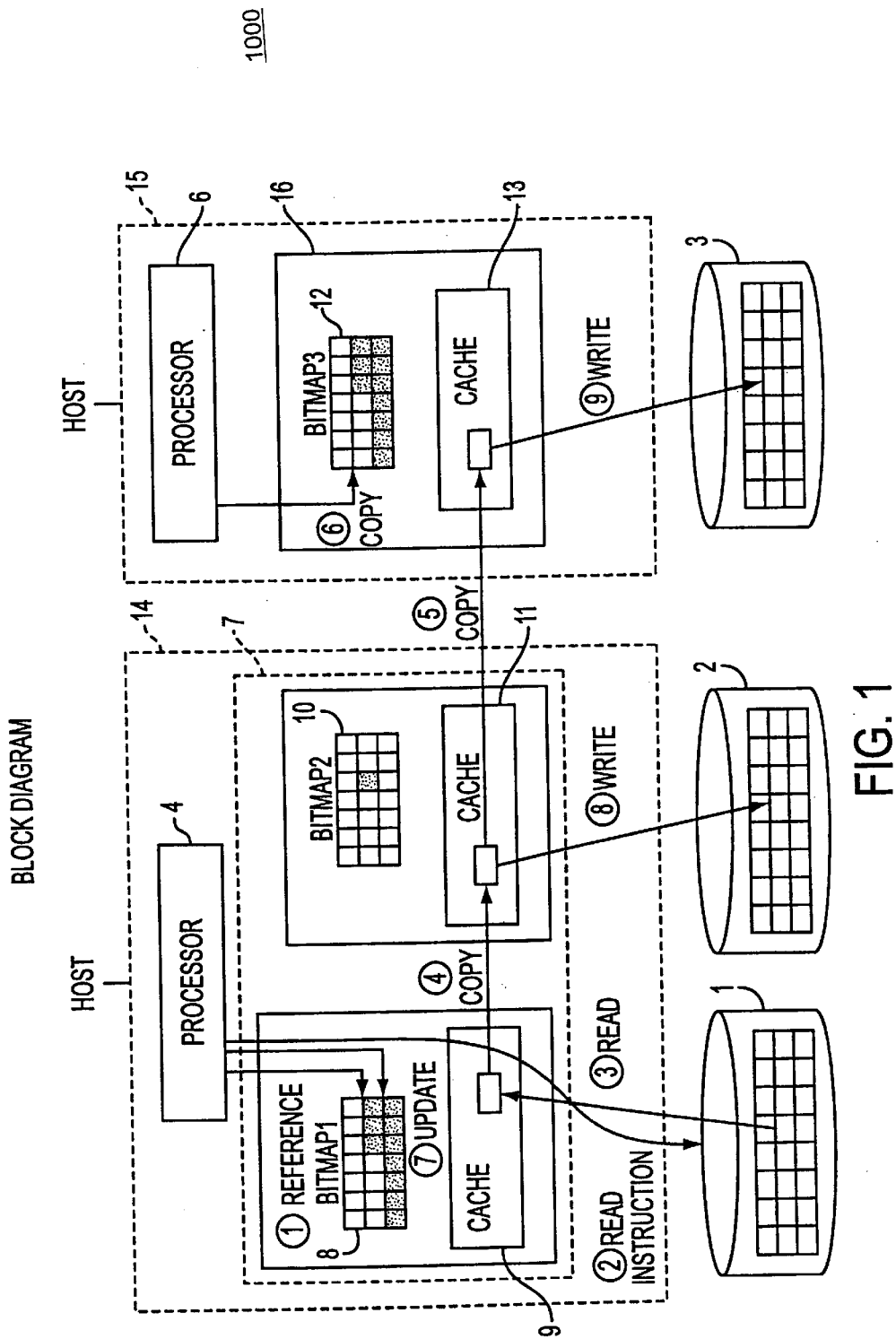
FIG. 1 is a block diagram for a disk control device of an embodiment mode of the present invention.
Figure 2:
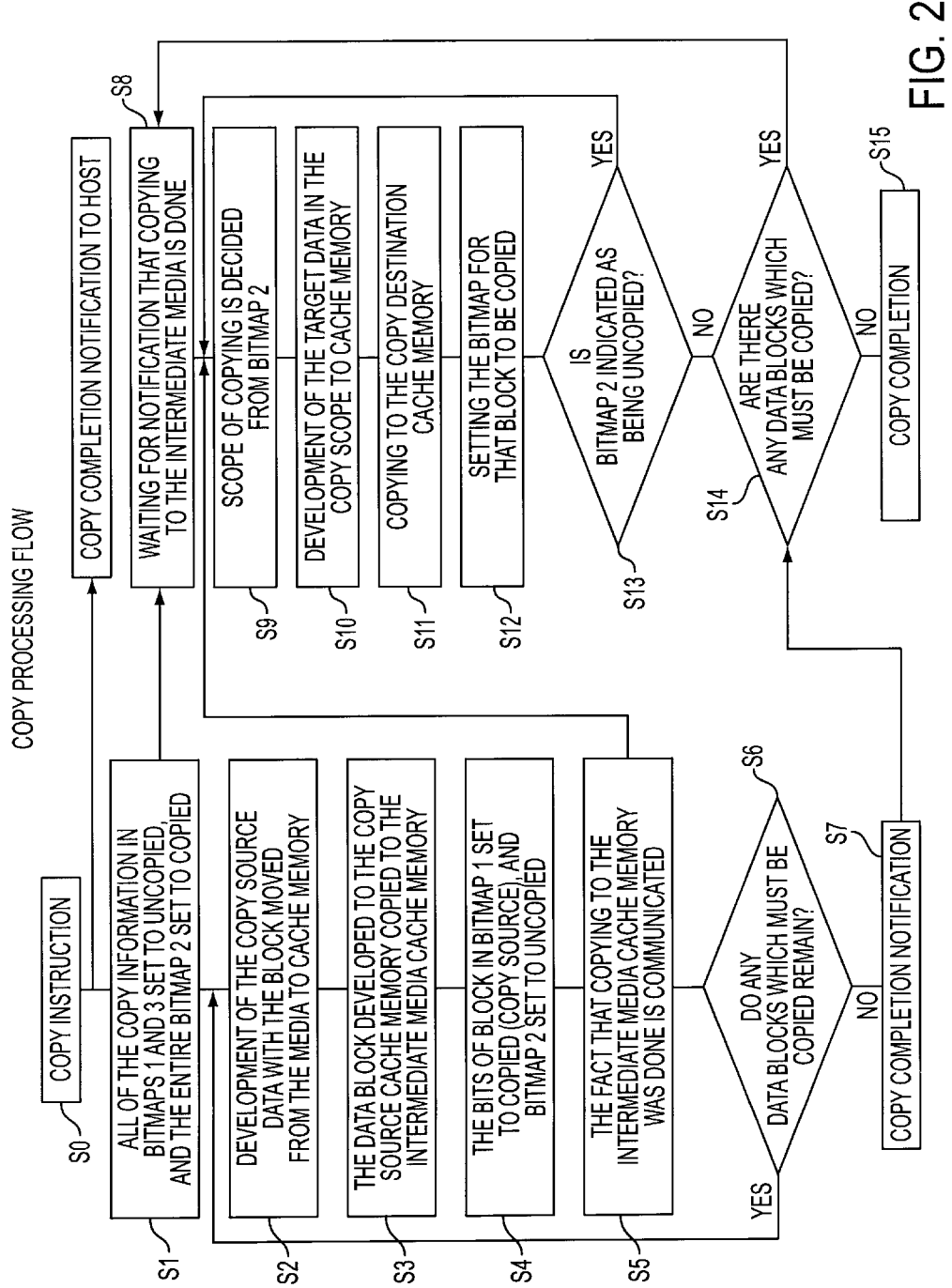
FIG. 2 is a flowchart diagram for copy processing of an embodiment mode of the present invention.

FIG. 1 is a block view of a storage system 1000 in a mode of one embodiment of the present invention. FIG. 2 is a copy process flowchart for FIG. 1. FIGS. 3A, 3B, 3C, and 3D are explanatory diagrams for the bitmap memory in FIG. 1.

As indicated in FIG. 1, the storage system 1000 of the present invention includes a RAID system, which comprises a logical disk 1 and one or more additional logical disks 2, 3. For the physical disk, either a magnetic disk or an optical disk may be used. A logical disk, such as logical disk 2, comprises one or more physical disks. A main center disk controller 14 accesses logical disks 1 and 2 in response to an instruction from a host computer (or host).

The disk controller 14 has a processor (CPU) 4 and a memory (main storage) 7. A cache region (referred to as cache memory) 9 on the logical disk 1 and a cache region (referred to as cache memory) 11 on the logical disk 2 are provided in the memory 7. Also, a bitmap area (referred to as a bitmap) 8 to control the copy status of the logical disk 1 and a bitmap area (referred to as a bitmap) 10 to control the copy status of the logical disk 2 are provided in the memory 7.

Figure 3A:
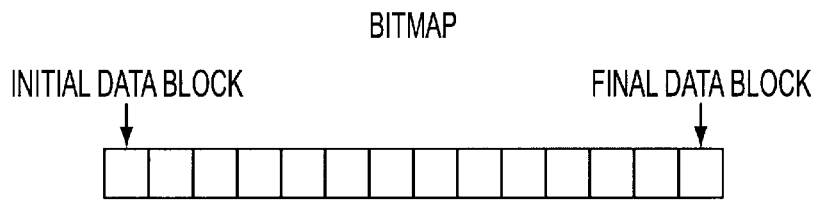
FIGS. 3A, 3B, 3C, and 3D are explanatory diagrams for the bitmap in FIG. 1.

More specifically, as indicated in FIG. 3A, the bitmaps 8 and 10 control the copy status of the data blocks with 1 bit allocated for each data block in the copy range of the logical disks 1 and 2, with "1" for uncopied blocks and "0" for copied blocks. The processor 4 operates based on the registration of the firmware stored in the memory 7. The copy range of the logical disks is copied by each data block unit using the bitmaps 8 and 10.

A logical disk 3 is also constructed with one or more logical disks. A disk controller 15 at the supplemental center accesses the logical disk 3 in response to an instruction from the main center or an instruction from the host. Access is enabled to the copy destination data region in the supplemental center through a communication line.

The disk controller 15 has a processor (CPU) 6 and a memory (main storage) 16. A cache region (referred to as cache memory) 13 on the logical disk 3 is provided in the memory 16. A bitmap area (referred to as a bitmap) 12 is provided in the memory 16 to control the copy status of the logical disk 3.

More specifically, as indicated in FIG. 3A, the bitmap 12 controls the copy status of the data blocks with 1 bit allocated for each data block in the copy range of the logical disk 3, with "1" for uncopied blocks and "0" for copied blocks. The processor 6 operates based on the registration of the firmware stored in the memory 7. The copy range of the logical disk is copied by each data block unit using the bitmap 12.

The copy processing is described according to the copy processing flow in FIG. 2. Here, the copy source is the logical disk 1, the intermediate media is logical disk 2 and the copy destination is the logical disk 3.

(S0) The host gives a copy instruction to the disk controller 14 to begin copying. When the processor 4 receives the copy instruction, it notifies the host of copy completion. The host is thereby able to access the logical disks 1, 2 and 3.

Figure 3B:
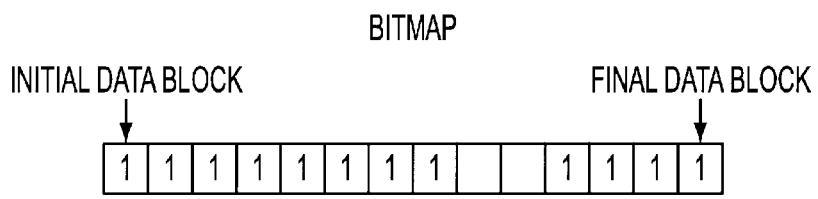

(S1) The processor 4 sets the copied block information in the copy source bitmap 8 to uncopied. The processor 4 instructs the supplemental center to set the copied block information in the copy destination bitmap 12 to uncopied. The process 4 sets the copied block information in bitmap 10 for the intermediate media to copied. As indicated in FIG. 3B, each bit in the bitmaps 6 and 10 are set to uncopied "1." Each bit in the bitmap 8 is set to copied "0."

The processor 4 then carries out copying from the intermediate media to the copy destination (S8 and thereafter) in parallel while carrying out copying from the copy source to the intermediate media.

(S2) The processor 4 references the copy source bitmap 8 and obtains the uncopied block information (1). The processor 4 assigns the lead of the target block to the copy source logical disk 1 (2). The target data block on the copy source logical disk 1 thereby develops in the cache memory 9 of the copy origin. This is referred to as staging (3).

(S3) The processor 4 copies the uncopied data block written to the cache memory 9 of the copy source to the intermediate media cache memory 11 (4).

(S4) The processor 4 sets the copy source bitmap 8 to copied "0" (7). The processor 4 sets the updated block information in the intermediate media bitmap 10 to uncopied "1." FIG. 3C indicates this situation.

(S5) The processor 4 instructs the intermediate media logical disk 2 to write the uncopied data block copied to the cache memory 11. The uncopied data block copied to the cache memory 11 is thereby written out to the logical disk 2. This is referred to as staging (8). For processor 4, when the destaging is complete, that fact is communicated to the process for copying (S8 and thereafter) from the intermediate media to the copy destination data region in the supplemental center.

(S6) The processor 4 references block information in the copy source bitmap 8 and determines whether any data blocks remain that must be copied. If any data blocks that must be copied remain, the process returns to process S 2.

(S7) If no blocks remain that must be copied, the copying completes, and the process for copying to the copy destination data region in the supplemental center is notified of the copy completion.

When there is an I/O request interrupt sent to the copy origin or copy destination logical disk 1 or 3 between the processes S3 and S7, the copy process is interrupted, and the access is processed (described below with FIGS. 4 to 12).

(S8) The copy process from the intermediate media to the copy destination data region in the supplemental center waits for a notification of write completion to the intermediate media.

(S9) When the processor 4 receives a notification of write completion to the intermediate media, the processor 4 references the intermediate media bitmap 10, and decides on the possible scope for copying to the copy destination data region.

(S10) The processor 4 copies the data blocks in the copyable scope to the intermediate media cache memory 11.

(S11) The processor 4 transfers to the supplemental center the uncopied data blocks read to the intermediate media cache memory 11 (5).

Figure 3C:
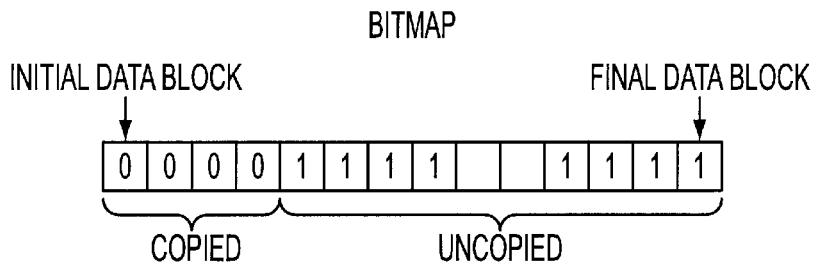

(S12) The processor 4 waits for a notification of write completion from the supplemental center, and sets the intermediate media bitmap 10 to copied "0." FIG. 3C indicates this situation.

(S13) The processor 4 references the intermediate media bitmap 10 and determines whether any uncopied regions remain. If any uncopied regions remain, the process returns to process S9, and processing is repeated.

(S14) The processor 4 references the intermediate media bitmap 10, and if no uncopied regions remain, determines whether there was a notification of copy completion from the copy source data region. If there is no notification of copy completion, the process returns to process S8 in which copying of data to the intermediate media is again waited for.

(S15) If there is a notification of copy completion, the processor 4 ends the copy processing (S15).

Figure 4:
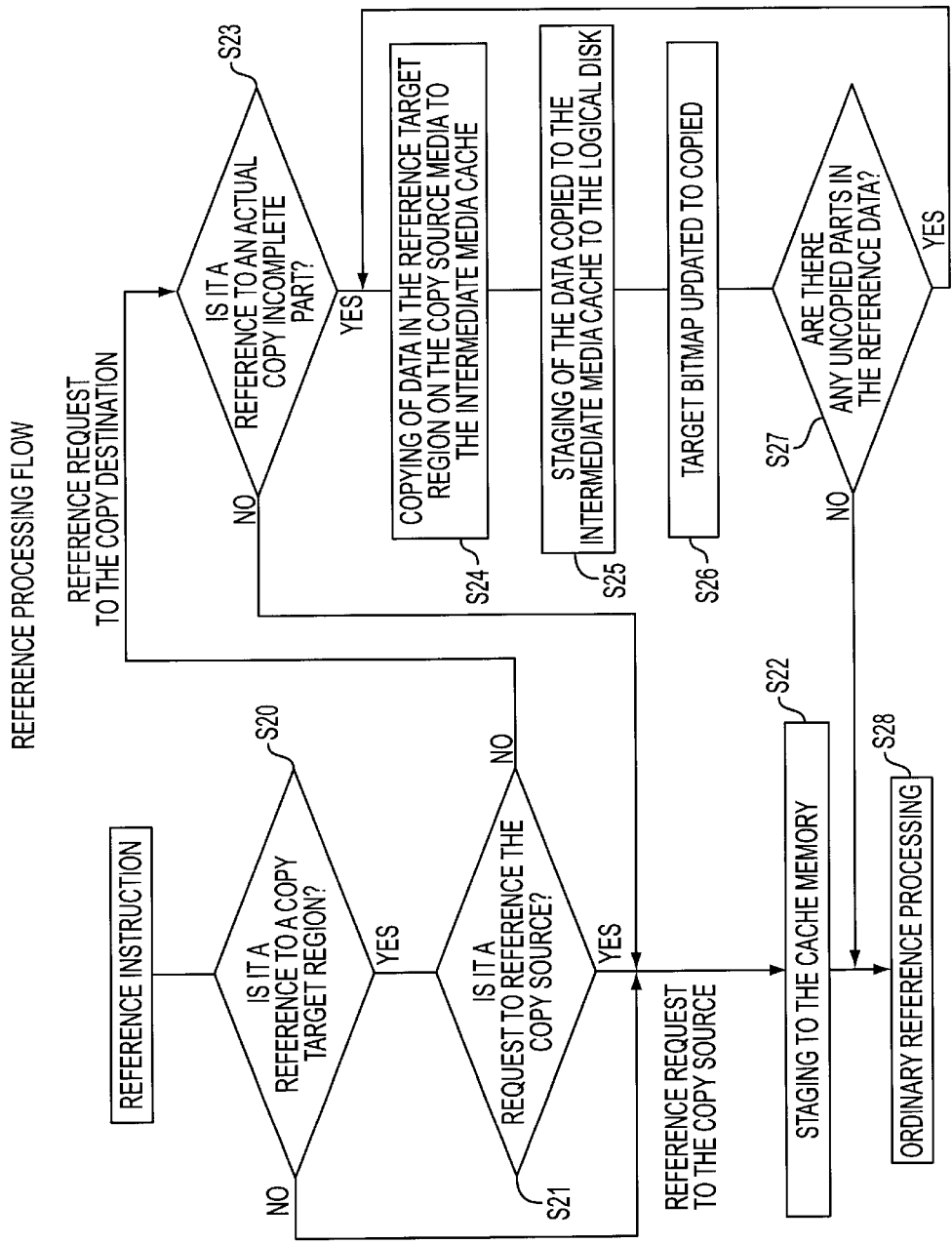
FIG. 4 is a flowchart diagram for reference processing during copying of an embodiment mode of the present invention.
Figure 5:
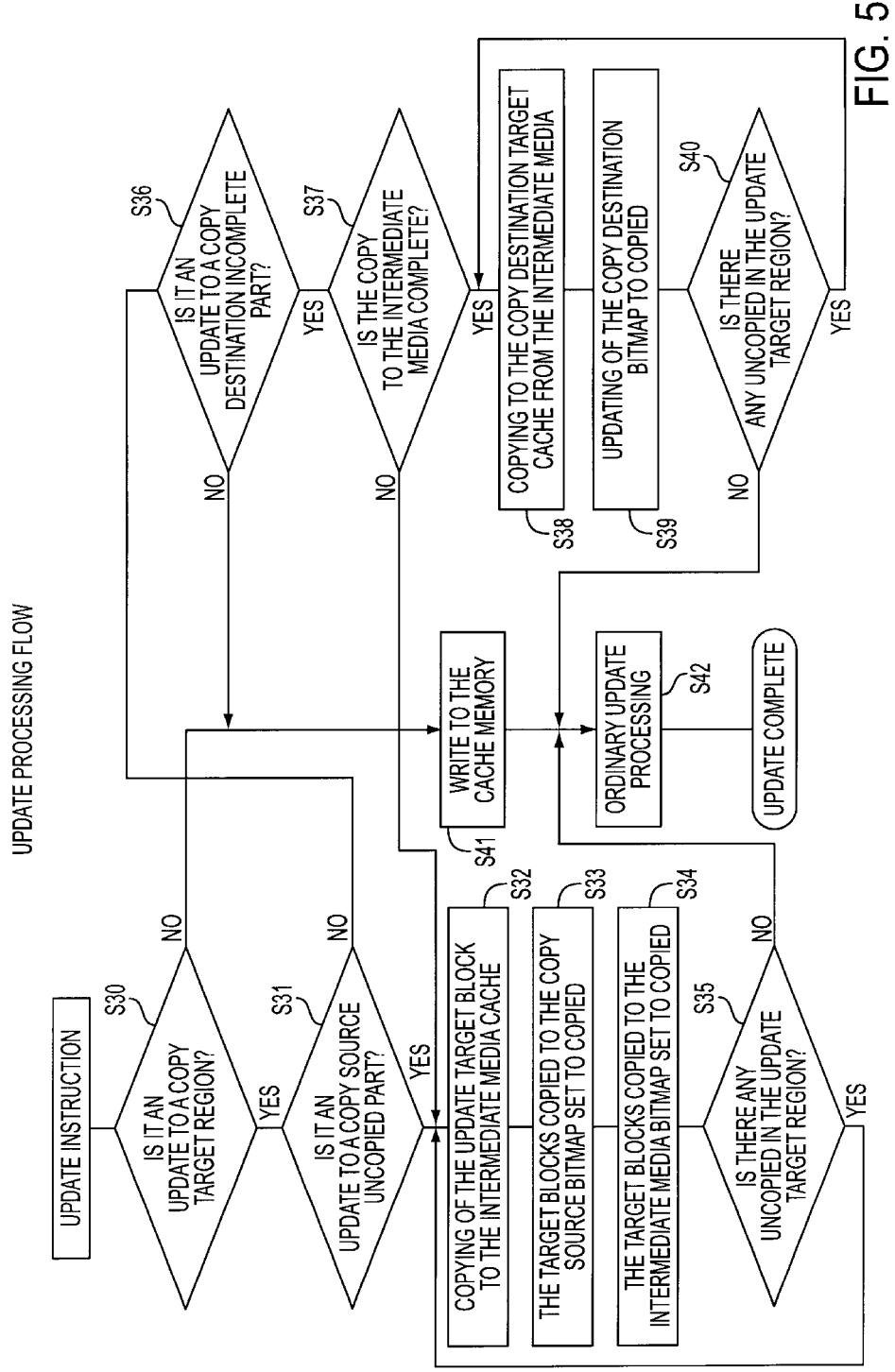
FIG. 5 is a flowchart diagram for update processing during copying of an embodiment mode of the present invention.
Figure 7:
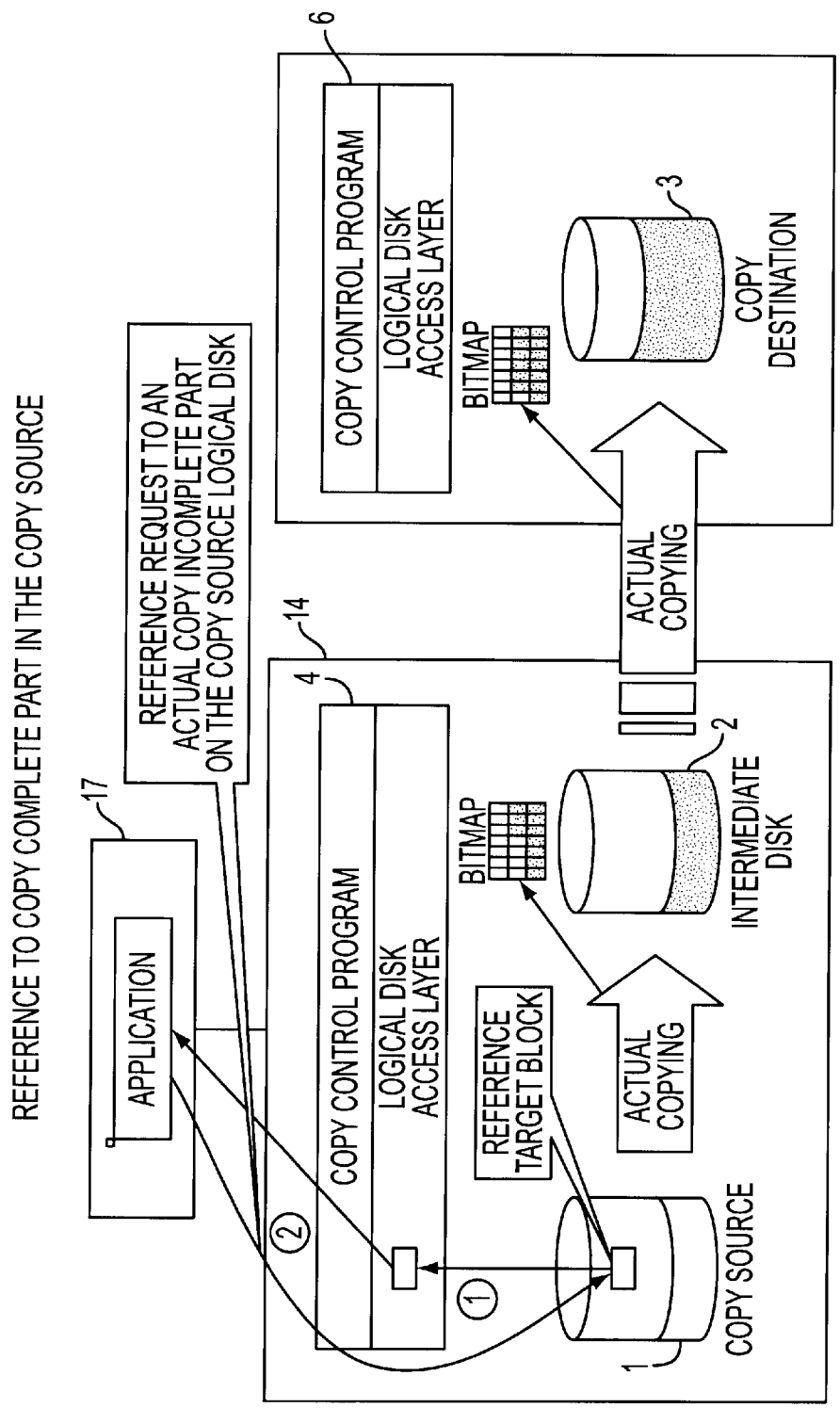
FIG. 7 is an explanatory diagram for a reference operation to a copy complete part of a copy source of an embodiment mode of the present invention.
Figure 8:
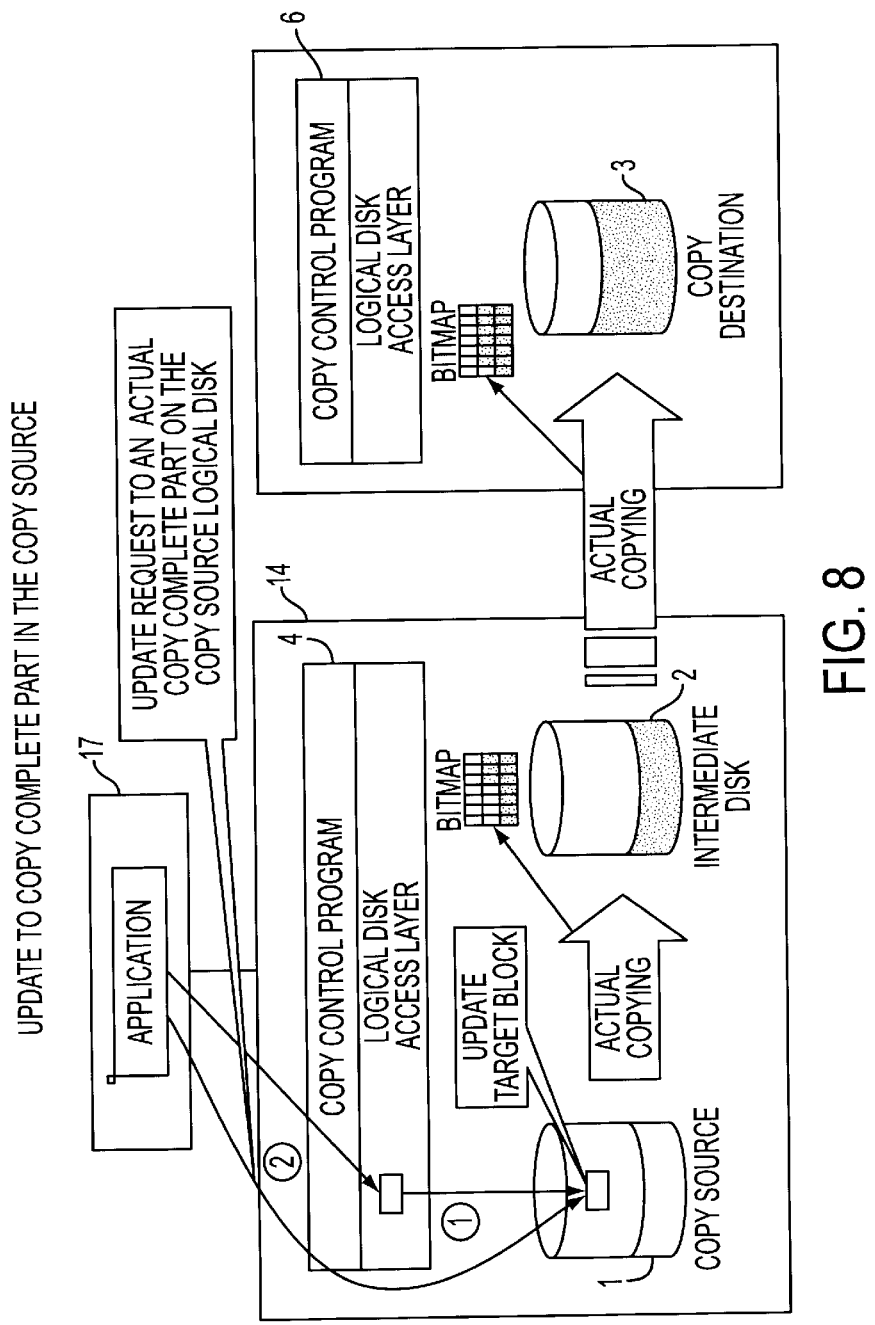
FIG. 8 is an explanatory diagram for an update operation to a copy complete part of a copy source of an embodiment mode of the present invention.
Figure 9:
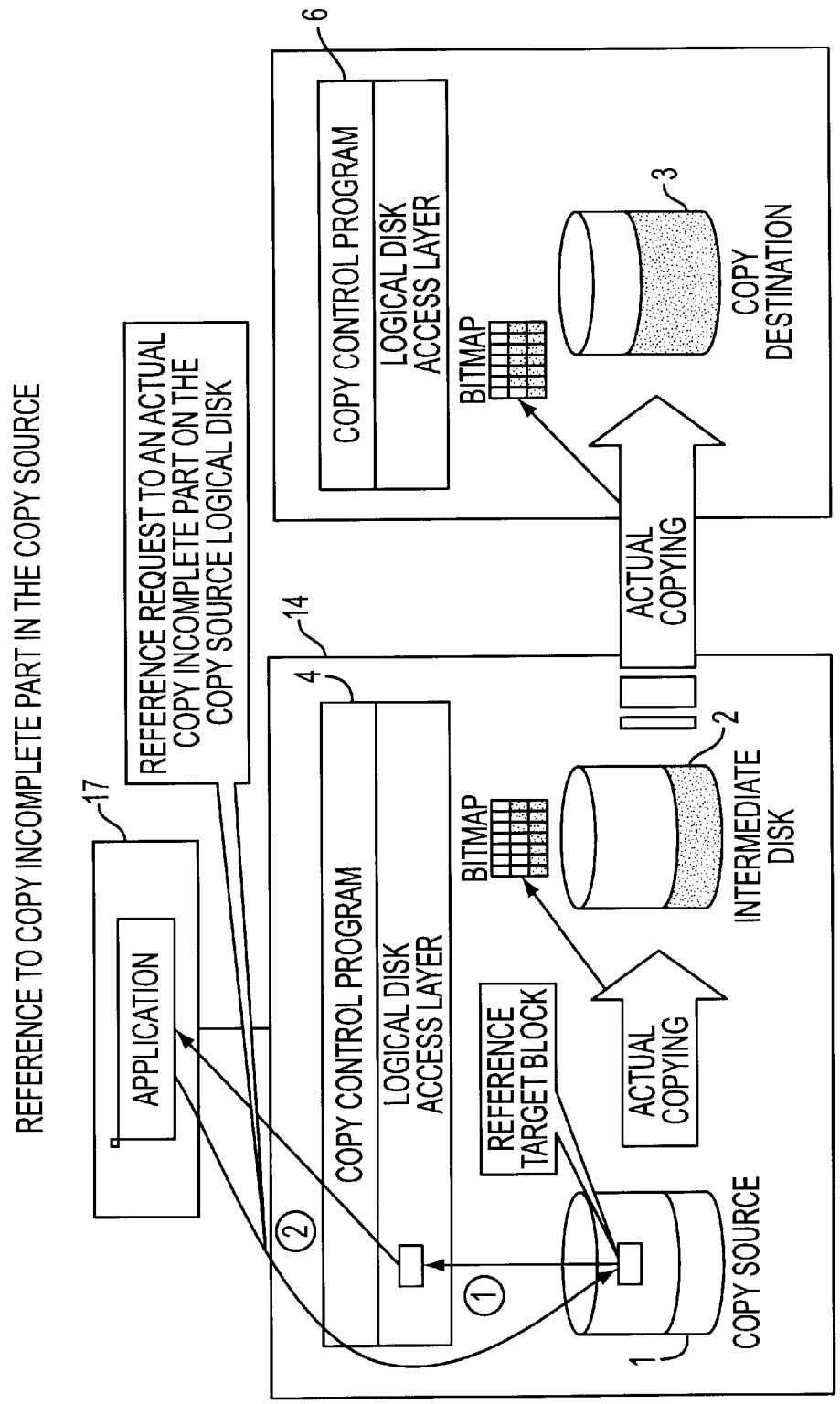
FIG. 9 is an explanatory diagram for a reference operation to a copy incomplete part of a copy source of an embodiment mode of the present invention.
Figure 10:
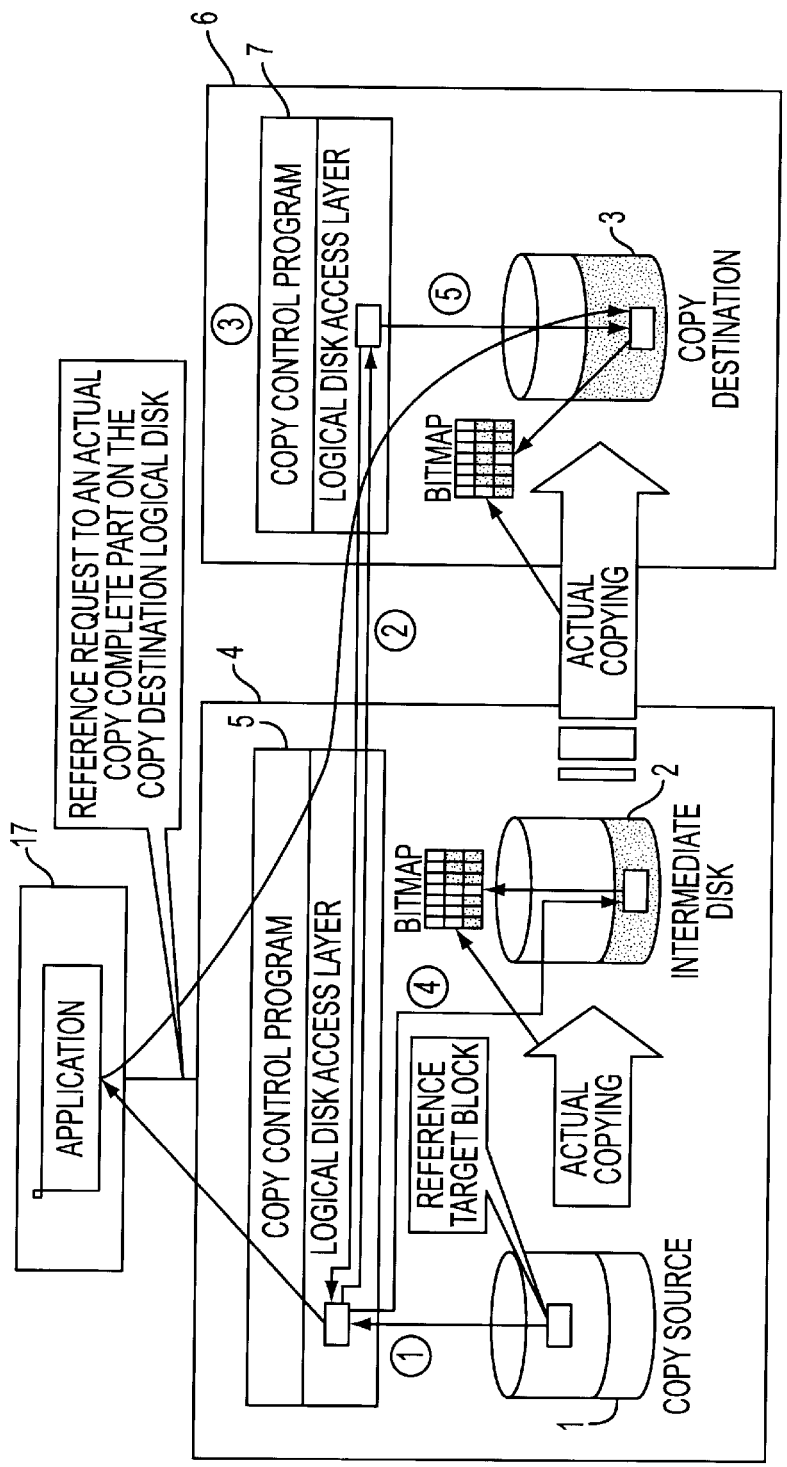
FIG. 10 is an explanatory diagram for a reference operation to a copy incomplete part of a copy destination of an embodiment mode of the present invention.
Figure 11:
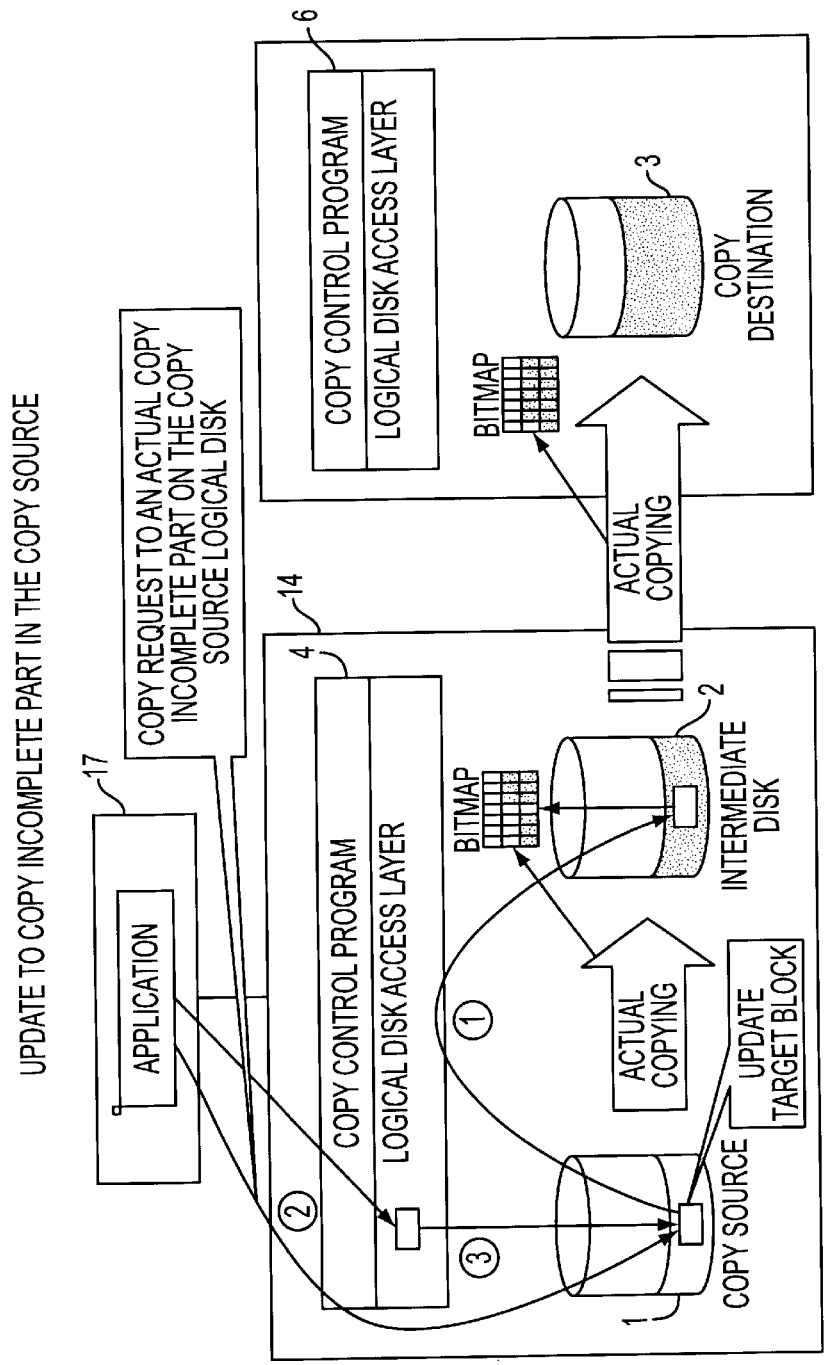
FIG. 11 is an explanatory diagram for an update operation to a copy incomplete part of a copy source of an embodiment mode of the present invention.
Figure 12:
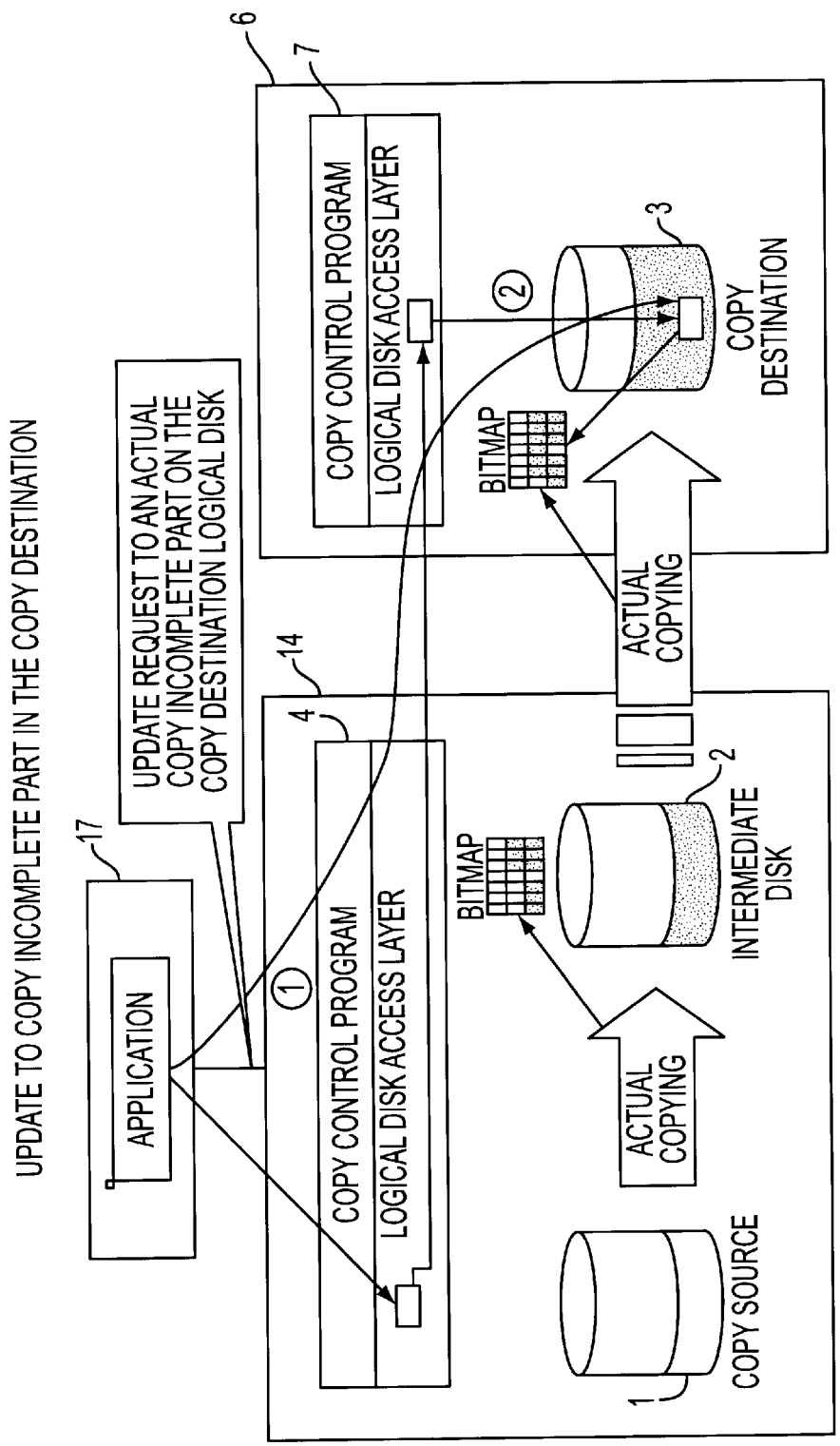
FIG. 12 is an explanatory diagram for an update operation to a copy incomplete part of a copy destination of an embodiment mode of the present invention.

FIG. 4 in a flowchart for referencing a logical disk during copying. FIG. 5 is a flowchart for updating a logical disk during copying. FIG. 6 is an explanatory diagram for the pattern of accesses to a logical disk during copying. FIGS. 7 to 12 are explanatory diagrams for those operations. FIG. 7 is an explanatory diagram of an operation for referencing a copy completion part of a copy source. FIG. 8 is an explanatory diagram of an operation for updating a copy completion part of a copy origin. FIG. 9 is an explanatory diagram of an operation for referencing a copy incomplete part of a copy original. FIG. 10 is an explanatory diagram for referencing a copy incomplete part of a copy destination. FIG. 11 is an explanatory diagram of an operation for updating a copy incomplete part of a copy source. FIG. 12 is an explanatory diagram of an operation for updating a copy incomplete part of a copy destination.

The reference processing during copying is described using FIG. 4.

(S20) The processor 4 determines whether the reference instruction (lead) is a reference to the copy target region or not. If it is not a reference to the copy target region, the process proceeds to staging in stage S22.

(S21) If the reference instruction is a reference to the copy target region, the processor 4 determines whether it is a reference request to the copy source. If it is a reference request to the copy source (access patterns 1 and 3 in FIG. 6), the process proceeds to staging in process S22.

(S22) The processor 4 stages the target data from the copy source data region to the copy source cache memory 9.

(S23) If it is not a reference request to the copy source, it is a reference request to the copy destination. The processor 4 references the bitmap 8, and determines whether the reference request region is a copy incomplete part from the copy source to the intermediate media. If it is not a reference request to a copy incomplete part for the intermediate media, or in other words, if it is a reference request to a copy complete part for the intermediate media (access patterns 5 and 7 in FIG. 6), the process proceeds to staging in process S22.

(S24) If it is a reference request to a copy incomplete part for the intermediate media (access pattern 7 in FIG. 6), the processor 4 assigns the lead of the target block to the copy source logical disk 1 as indicated in FIG. 10, and stages the target data block of the copy source logical disk 1 to the cache memory 9 in the copy source (9). The processor 4 copies the uncopied data block read to the cache memory 9 in the copy source to the cache memory 11 for the intermediate media.

(S25) The processor 4 instructs the intermediate media logical disk 2 to write the uncopied data block copied to the cache memory 11. The uncopied data block copied to the cache memory 11 is thereby written out to the logical disk 2.

(S26) The processor 4 sets the block information in the copy source bitmap 8 to copied "0." The processor 4 sets the block information in the intermediate media bitmap 10 to uncopied "1."

(S27) The processor 4 determines whether there are still any data blocks comprising a reference target. If there still is a data block comprising a reference target, the process returns to S23. If there are no data blocks comprising a reference target, the reference ends.

(S28) In ordinary reference processing, the processor 4 transfers the block staged to the cache memory 9 to the host 17 and ends.

Accordingly, an operation of referencing a copy complete part in the copy source (access pattern 1 in FIG. 6) is done as indicated in FIG. 7. An operation of referencing a copy incomplete part in the copy source (access pattern 3 in FIG. 6) is done as indicated in FIG. 9. An operation of referencing a copy complete part of the copy destination (access pattern 5 in FIG. 6) is as in FIG. 7.

Next is a description of the update process during copying using FIG. 5.

(S30) When the processor 4 determines that there is an update instruction (write), it then determines whether or not to update the copy target region. If the determination is not for a copy target region, the process proceeds to writing to the cache memory 9 in process S41.

(S31) If the determination is for a copy target region, the processor 4 references the bitmap 8 and determines whether it is a request to update a copy incomplete part in the copy source. If it is not a request to update a copy incomplete part in the copy source, the process proceeds to the determination in process S36.

(S32) If it is a request to update a copy incomplete part in the copy source (access pattern 4 in FIG. 6), as indicated in FIG. 11, the processor 4 assigns the lead of the update target block to the copy source logical disk 1, and stages the update target data block in the copy source logical disk 1 to the cache memory 9 in the copy source. Next, the processor 4 copies the update target data block read into the cache memory 9 in the copy source to the intermediate media cache memory 11. The processor 4 assigns the staging of the update target data block copied to the cache memory 11 to the intermediate media logical disk 2. The update target data block copied to the cache memory 11 is destaged to the logical disk 2.

(S33) The processor 4 sets the copy block information in the copy source bitmap 8 to copied "0."

(S34) The processor 4 sets the copy block information in the intermediate media bitmap 10 to uncopied "1."

(S35) The processor 4 determines whether there are any data blocks comprising an update target. If there is still a data block comprising an update target, the process returns to process S32. If there are no more data blocks comprising an update target, the process proceeds to normal update processing in process S42.

(S36) The processor 4 references the bitmap 11, and determines whether the update instruction is a request to update a copy incomplete part in the copy destination (access pattern 8 in FIG. 6). If the update instruction is not a request to update a copy incomplete part in the copy destination, the processor 4 proceeds to processing the writing to the cache memory 9 in process 41.

(S37) The processor 4 references the bitmap 8, and determines whether the copying of the update target block from the copy source data region to the intermediate media data region is complete. If the copying is not complete, the process proceeds to the writing of the cache memory 9 in process S41.

(S38) If the copying to the intermediate media is complete, the processor 4 begins data transfer from the intermediate media to the cache memory 13 to the copy destination data region in the supplemental center.

(S39) When the processor 4 receives a write complete report from the supplemental center, it sets the copy block information in the bitmap 11 to copied "0."

(S40) The processor references the bitmap 11 and checks whether uncopied regions remain in the update target region. If an uncopied region remains, the process returns to process S38, and the processing continues. If no more uncopied regions remain, the process proceeds to writing to the cache memory 9 in process S41.

(S41) The update data is written to the cache memory 9 in the copy source data region.

(S42) The update data block in the cache memory 9 transferred from the host is written to the logical disk 1 and the update ends.

An operation of updating a copy complete part in the copy source (access pattern 2 in FIG. 6) is as indicated in FIG. 8. An operation of updating a copy complete part in the copy destination (access pattern 6 in FIG. 6) is a conventional operation.

Summarizing the above operations, if the access from the host to the intermediate media is included, there are 12 access patterns from the host during copying as indicated in FIG. 6. For referencing a copy complete part in the copy source or copy destination logical disk 1 or 3 (access patterns 1 and 5), the data block of the reference data is staged from the specified logical disk 1 or 3 to the cache memory 9 or 13, after which the host is notified of the staged data block (refer to FIG. 7). This processing does not affect the copy complete/incomplete status of the data block, so it is identical to ordinary referencing processing.

For updating a copy complete part in the copy source or copy destination logical disk 1 or 3 (access patterns 2 and 6), the updated data block residing in the cache memory 9 or 13 is written to the copy source or copy destination logical disk 1 or 3 (refer to FIG. 8). Because the copying of the data block is complete, this processing is identical to ordinary update processing.

For referencing a copy incomplete part in the copy source logical disk 1 (access pattern 3), the data block of the reference data is staged from the copy source logical disk 1 to the cache memory 9, after which the host is notified of the staged data block (refer to FIG. 9). This processing does not affect the copy complete/incomplete status of the data block, so it is identical to ordinary reference processing.

At this time, the staged data block is written to the intermediate media logical disk 2, so copying can be carried out. In this instance, only the reference described above is carried out, and the copying can be carried out afterwards.

Figure 3D:
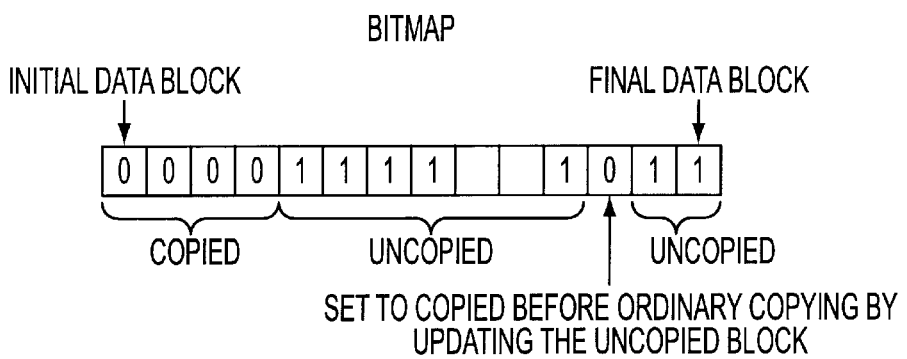

For updating a copy incomplete part of the copy source logical disk 1 (access pattern 4), the update target data block in the copy source logical disk 1 is written (copied) to the intermediate media logical disk 2. At this time, as indicated in FIG. 3D, the bitmap 8 which controls the copy status is updated to copied, and the copy status of the data block region is set to completed. The update data block is then written to the copy source logical disk 1 from the host (refer to FIG. 11).

For referencing a copy incomplete part in the copy destination logical disk 3 (access pattern 7), the reference target data block is staged in the cache memory 9 before copying from the copy source logical disk 1, and the host is then notified of the staged data block. If the copying to the intermediate media data region is incomplete, the staged data block is written to the intermediate media logical disk 2 (refer to FIG. 10). At this time, as indicated in FIG. 3D, the update bit of the data block in the bitmap 8 which controls the copy status is updated to copied, and the copy status of the data block region is set to complete.

If the copying to the intermediate media data region is complete, the data of the copy source data region is already secured, so update processing to the copy source logical disk 1 is carried out in an ordinary fashion.

For updating a copy incomplete part in the copy destination logical disk 3 (access pattern 8), the update data block is written from the host to the copy destination logical disk 3 (refer to FIG. 12). At this time, as indicated in FIG. 3D, the update bit in the bitmap 10 which controls the copy status is updated to copied, and the copy status of the data block region is set to completed. Because of this, copying the data block region from the copy source to the copy destination is prohibited.

If the copying to the intermediate media logical disk 2 is incomplete, writing the update data for the copy destination logical disk 3 to the intermediate media logical 2 is enabled. In such a case, the update bits of the bitmap 8 controlling the copy status must be updated to copied and the copying status of the data block region must be set to complete.

Figure 13:
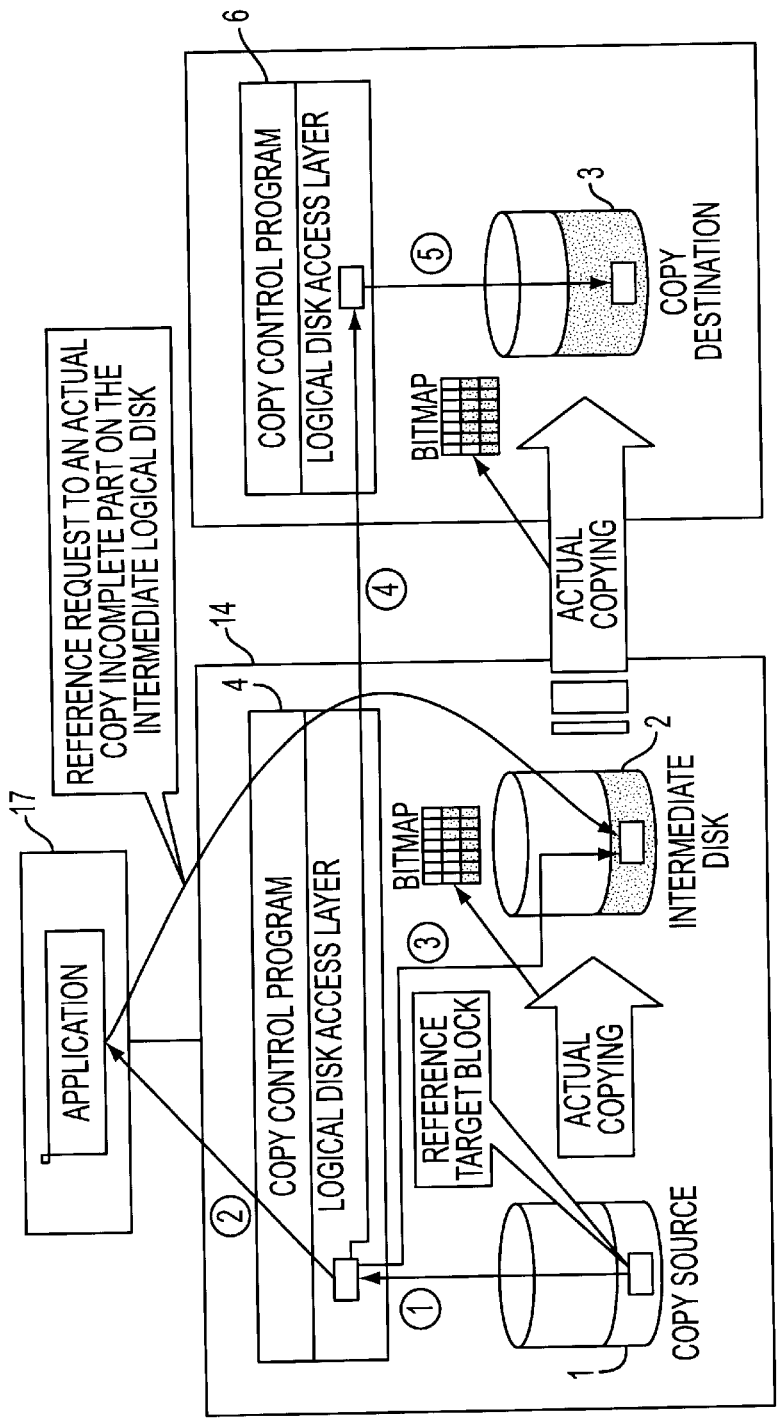
FIG. 13 is an explanatory diagram for a reference operation to a copy incomplete part on an intermediate media of an embodiment mode of the present invention.
Figure 14:
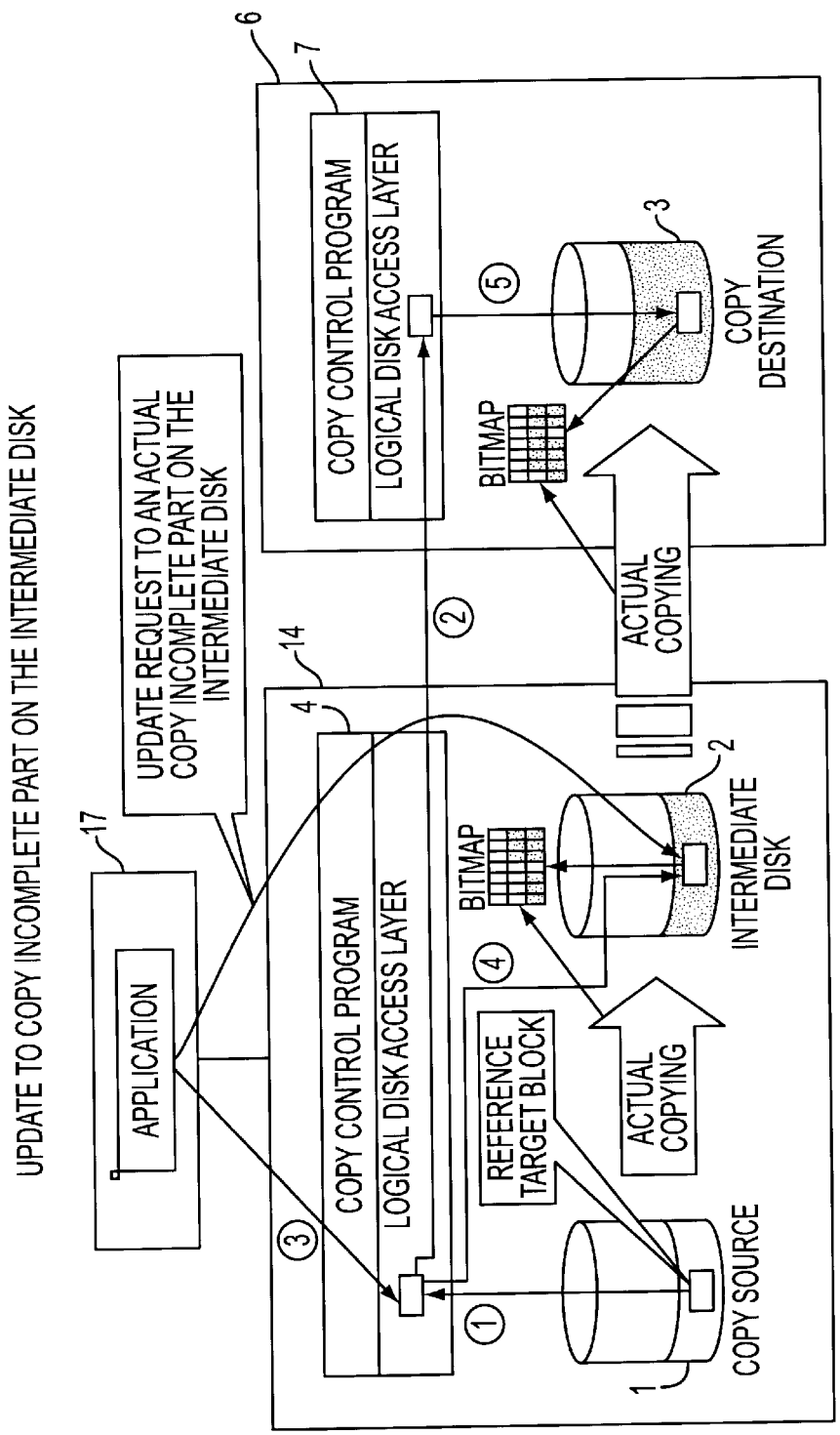
FIG. 14 is an explanatory diagram for an update operation to a copy incomplete part on an intermediate media of an embodiment mode of the present invention.

In addition to the above, a mode permitting access to the intermediate media from the host (application) is also a possibility. FIGS. 13 and 14 indicate this condition.

When referencing a copy source logical disk for a copy complete part for the intermediate media logical disk (access pattern 9), the reference data block is staged to the cache memory 9 from the specified logical disk 1 after which the host is notified of the staged data block. This processing does not affect the copy complete/incomplete status of the data block, so the processing is identical to ordinary reference processing.

When referencing a copy source logical disk for a copy incomplete part for the intermediate media logical disk 2 (access pattern 11), the reference data block is staged to the memory 9 from the copy source logical disk 1 after which the host is notified of the staged data block (refer to FIG. 13). This processing does not affect the copy complete/incomplete status of the data block, so the processing is identical to ordinary reference processing.

When updating a copy source logical disk for a copy complete part for the intermediate media logical disk 2 (access pattern 10), the updated data block residing in the cache memory 9 is written to the copy source logical disk 1. The copying of this data block is completed, so this processing is identical to ordinary update processing.

When updating the copy source logical disk for a copy incomplete part for the intermediate media logical disk 2 (access pattern 12), the update target data block in the copy source logical disk 1 is staged to the cache memory 9 and copied to the cache memory 13. The update block is then written from the host to the copy source logical disk 1 (refer to FIG. 14).

In this manner, copy ranges are divided into a plurality of regions, and the copy processing is carried out by divided region unit. Because of this, it is possible to receive an I/O request from a host and process the I/O request during copying. Accordingly, even if a copy instruction is received, access to the logical disk is enabled immediately.

For access for updating a copy incomplete region on a copy source logical disk, the copy incomplete region on the copy source logical disk is copied to a copy destination logical disk, and then the copy incomplete region on the copy source logical disk is updated, so it is possible to prevent the copy data on the copy destination logical disk from becoming updated data.

Further, even for accesses for referencing a copy incomplete region on a copy destination logical disk, the copy data can be provided because the data in that region on the copy source logical disk is read and forwarded. As in the embodiment, processing may be added where the data in that region of the read copy source logical disk is copied to the copy destination logical disk. This enables the copied data to be utilized in copying.

Further, for an access for updating a copy incomplete region on a copy destination disk, updating the data in that region on the copy destination logical disk with update data and copying to that region is prohibited, so the update data is prevented from being modified with copied data.

Control information controlling the copy status of each region is provided through bitmaps or the like, so it is simple to determine whether a region is copy complete or copy incomplete. Further, during access processing, the copying of other regions is carried out first, and even if that access region is copied beforehand, re-copying is prevented. Similarly, even if the copy destination logical disk is updated, replacing the update data with the copied data is prevented.

Because the control information is a bitmap, copy control is possible using little capacity. The bitmaps 6 and 8 are provided on each logical disk, but each logical disk may be configured with a common bitmap.

Access to and copying of the logical disks 1, 2 and 3 is possible utilizing well known access technology using cache memory. More specifically, in systems where a part of the data on a physical disk is staged in cache memory, the cache memory is first accessed and the block data is found for accesses to the physical disk. When the block data is not staged in the cache memory, the physical disk is accessed and the block data is obtained. This is similar to updates where the data in the cache memory is updated. Some other well known cache memory such as this may also be used. For such a case, the logical disks 1, 2 and 3 comprise a physical disk and cache memory.

Figure 15:
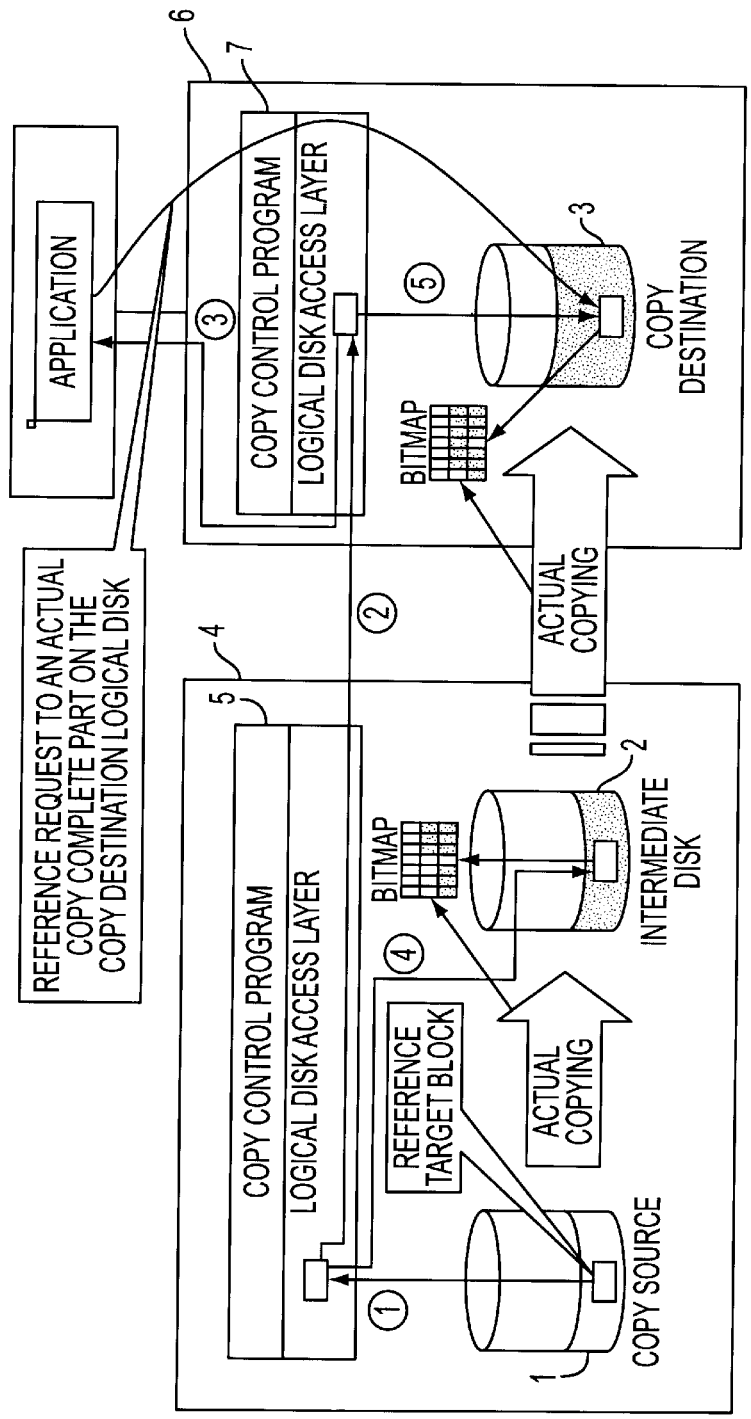
FIG. 15 is an explanatory diagram for a reference operation to a copy incomplete part of a copy destination of an embodiment mode of the present invention.

FIG. 15 indicates a state where a host 100 connected to a supplemental center has carried out a reference request for a copy incomplete block on the copy destination logical disk 3. In this case, a processor 6 requests the main center to copy that region, and after the data copying from the main center is complete, the data is transmitted to the host. Copying to that region is thereafter prohibited, so the bitmap 12 is updated and the bits corresponding to that block are set to copied "0."

Figure 16:
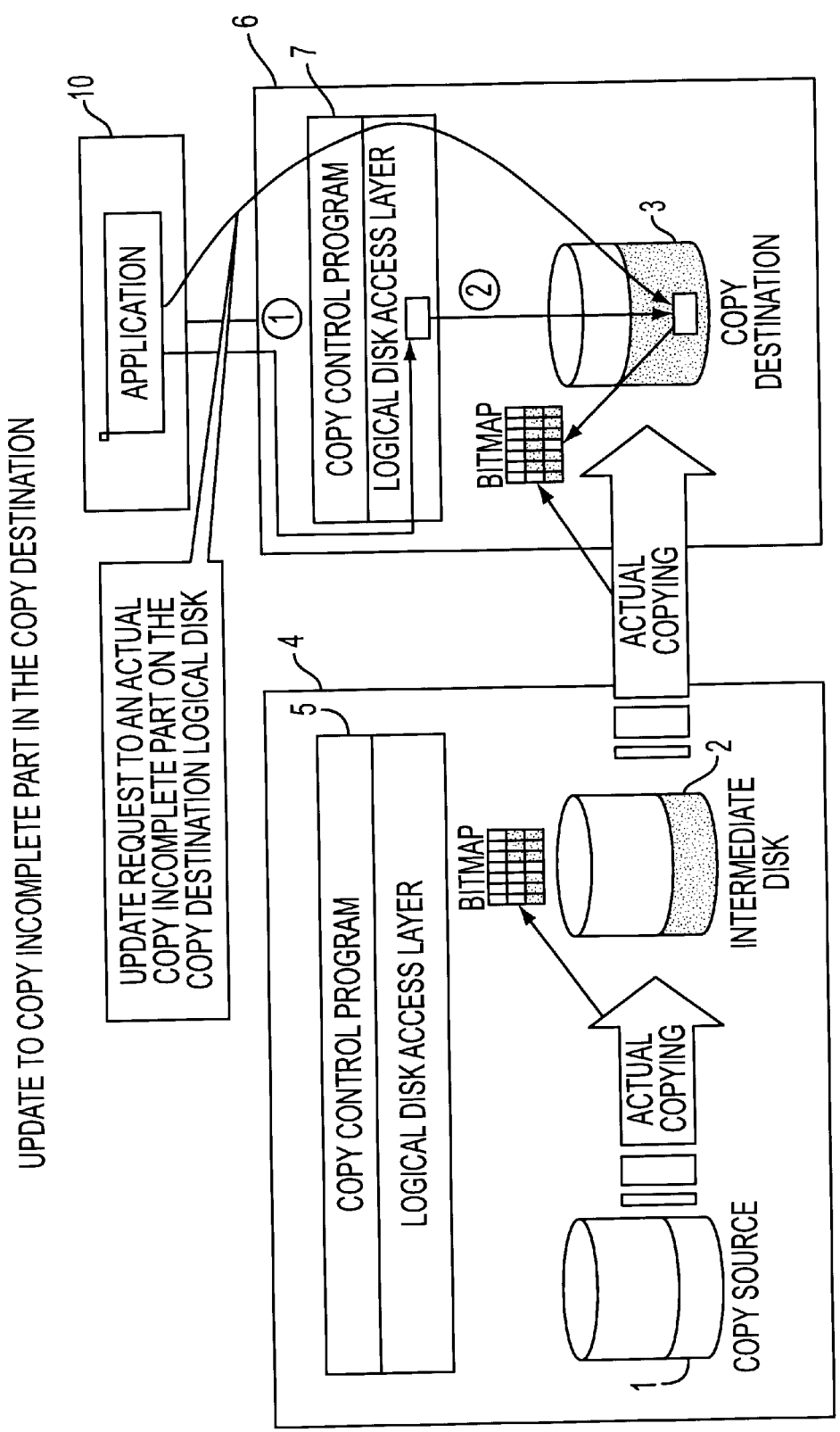
FIG. 16 is an explanatory diagram for an update operation to a copy incomplete part of a copy destination of an embodiment mode of the present invention.
Figure 17:
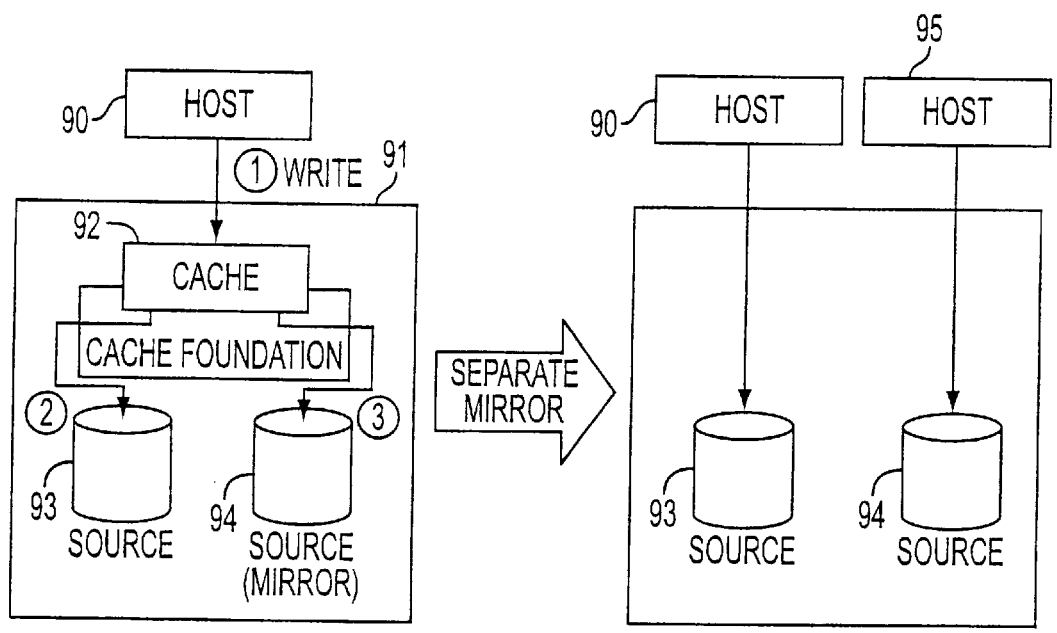
FIG. 17 is a configuration diagram for a conventional separate dual volume system.
Figure 18:
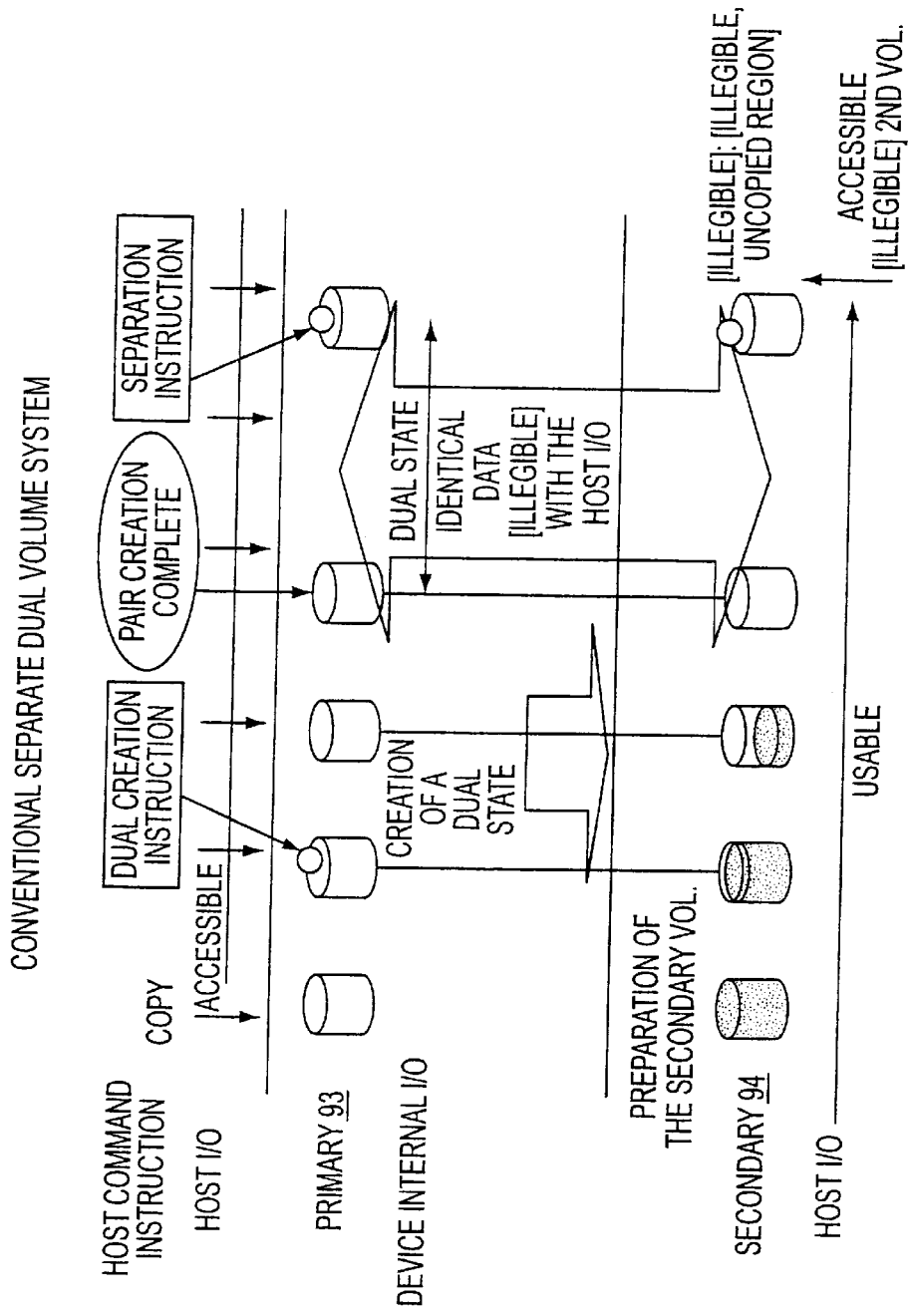
FIG. 18 is an explanatory diagram for an operation of a conventional separate dual volume system.
Figure 19:
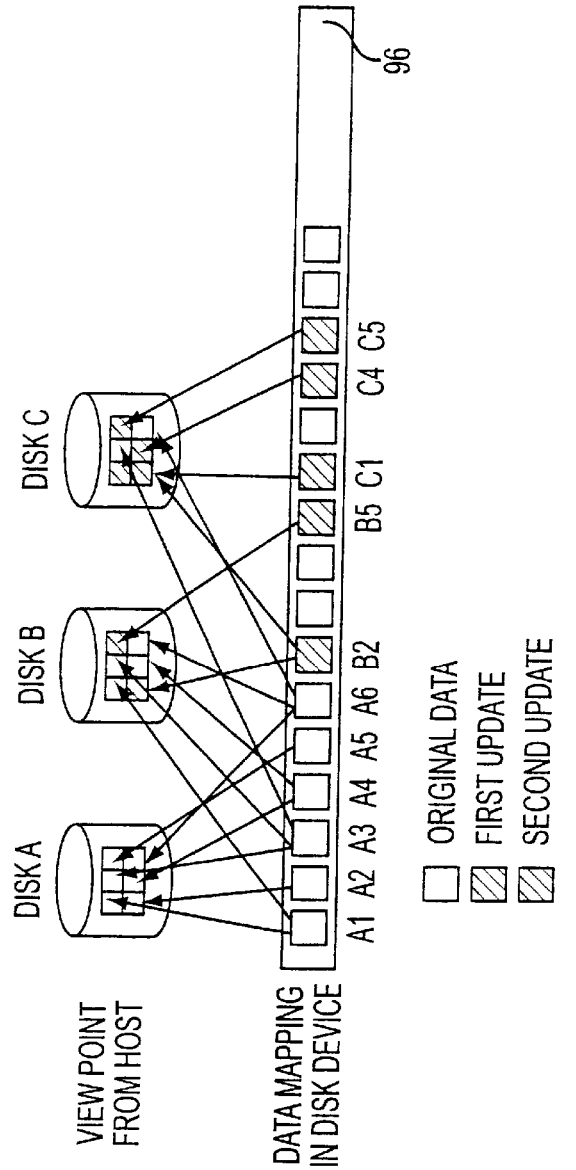
FIG. 19 is an explanatory diagram of a conventional log structured system.
Figure 20:
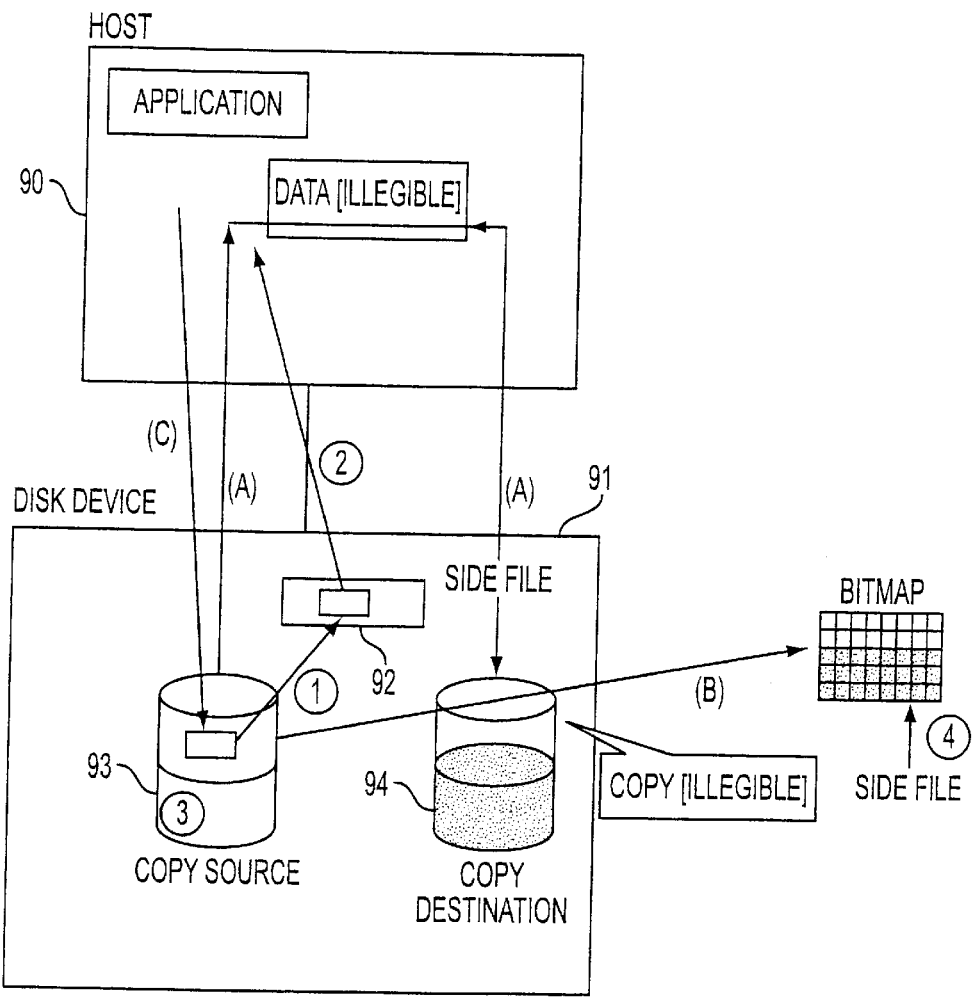
FIG. 20 is an explanatory diagram of a conventional concurrent copy system.

FIG. 16 indicates a state where a host 100 connected to a supplemental center has carried out an update request for a copy incomplete block on a copy destination logical disk 3. In this case, a processor 6 writes the data onto the copy destination logical disk 3, and the processing by the host ends. Copying to that region is thereafter prohibited, the bitmap 12 is updated, and the bits corresponding to that block are set to copied "0."

Figure 21:
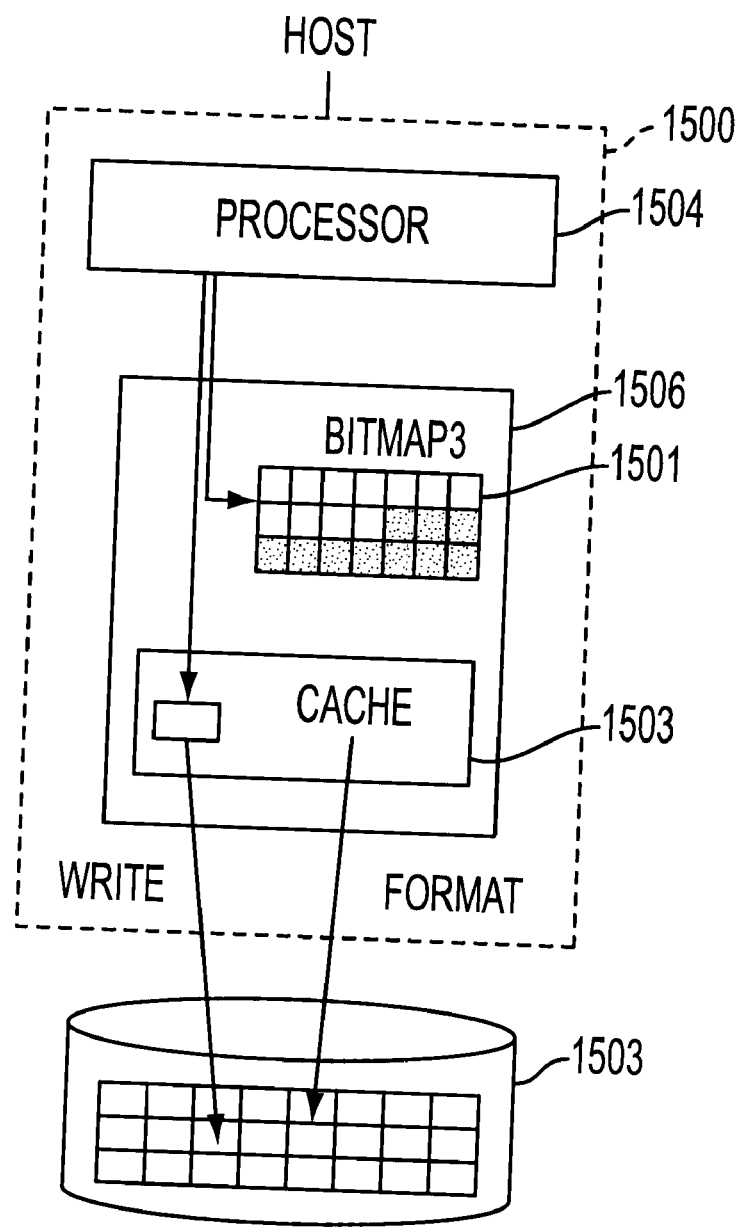
FIG. 21 is a configuration view of a storage system of another embodiment mode of the present invention.

FIG. 21 is a configuration view of a storage system of another embodiment mode of the present invention.

In the present embodiment, a storage system 1500 has a bitmap 1501 in a logical disk 1503, and records format completed blocks. A processor 1504 records "1" meaning unformatted before beginning formatting for all the bits. Bits corresponding to blocks whose formatting is complete are set to "0."

Figure 22:
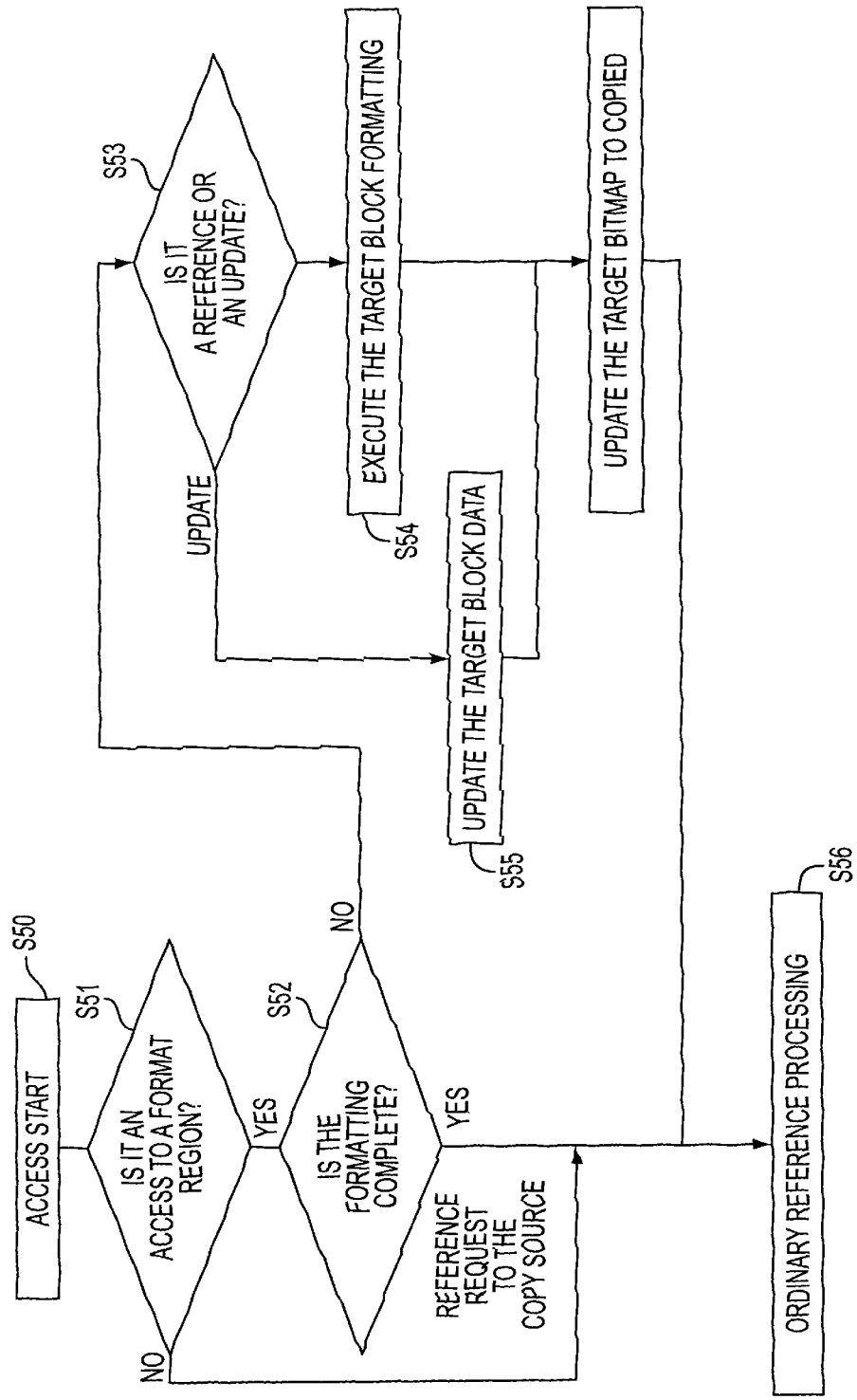
FIG. 22 is a processing flowchart.

FIG. 22 is processing flowchart.

(S50) Access is made by a host device.

(S51) The processor 1504 determines whether the access from the host device is for a format target region or not.

If the access is for other than a format target region, ordinary processing in process S56 is carried out.

(S52) If the access is for a format target region, the processor 1504 determines whether formatting for that access target block is complete or not. If the formatting is complete, ordinary processing in process 56 is carried out.

(S53) If the access target block is unformatted, the processor 1504 determines whether the access is for referencing or updating.

(S54) If the access is for referencing, the processor 1504 carries out the formatting for that block, and after substituting "0" meaning formatted for the bit corresponding to that block in the bitmap 1501, the processor 1504 references the data in that block. Or, the processor 1504 may use the fact that the format pattern is fixed and reply with the prescribed data. In such a case, no modifications are made to the data on the logical disk, so the bitmap is not modified to complete the format later.

(S55) If the access is for updating, the processor 1504 updates the target block on the logical disk with update data, substitutes "0" meaning formatted for the corresponding bit on the bitmap and ends the processing.

In addition to the embodiments of the present invention described above, modifications to the present invention, such as the following, are also possible.

(1) In the embodiments described above, a processor 4 of a disk controller 3 carries out copying, but a host such as a server can also carry out the copying. It is also fine if the disk controller 3 is deleted and a host such as a server carries out the copying and accessing.

(2) In an access for referencing a copy incomplete region on a copy destination logical disk, the copy source logical disk is referenced and the copy destination logical disk is copied, but it is fine if referencing of the copy source logical disk and copying of the copy destination logical disk are carried out separately.

In addition to the embodiments of the present invention described above, the present invention can be altered variously within the scope of the main gist of the invention, and such variations may not be excluded from the scope of the present invention.

More particularly, a first variation of the present invention includes the following.

A processing method for copying between storage device data regions. The foregoing processing method of the present invention includes a method for copying between data regions in a storage device which copies data in a copy source data region to a copy destination data region in response to a copy instruction. The method includes copying the data in the aforementioned copy source data region to an intermediate media data region for each prescribed block unit as well as for copying the data copied to the intermediate media data region to the aforementioned copy destination data region in response to a copy instruction. The method also includes processing an access to a block in the aforementioned copy source or the aforementioned copy destination data region by a device connected to the aforementioned copy source data region during the aforementioned copying by interrupting the aforementioned copying.

Moreover, the above-mentioned processing the aforementioned access includes:

determining for each data region whether or not the aforementioned access target block is one for which copying is complete, and based on this determination, updating the aforementioned access target block in the aforementioned copy source data region after copying data stored in the aforementioned access target block in the aforementioned copy source data region to the aforementioned intermediate media data region when the aforementioned access is for updating a block for which copying of the aforementioned copy source data region is not yet complete, referencing data in the aforementioned copy source data region when the aforementioned access is for referencing a block for which copying of data to the aforementioned intermediate media data region from the aforementioned copy source data region is not yet complete and for which copying of the aforementioned copy destination data region is not yet complete, referencing data in the aforementioned copy source data region or data in the aforementioned intermediate media data region when the aforementioned access is for referencing a block for which copying of the data in the aforementioned intermediate media data region from the aforementioned copy source data region is complete and for which the copying of the aforementioned copy destination data region is not yet complete, prohibiting copying from the aforementioned copy source data region to a block storing data after the data in the aforementioned intermediate media data region is updated, or to prohibit updating of the aforementioned access target block in the aforementioned copy destination data region and copying to that block when the aforementioned access is for updating a block for which copying of data in the aforementioned intermediate media data region from the aforementioned copy source data region is not yet complete and for which copying of the aforementioned copy destination data region is not yet complete, and prohibiting updating of the aforementioned access target block in the aforementioned copy destination data region and copying to that block when the aforementioned access is for updating a block for which copying to the aforementioned intermediate media data region from the aforementioned copy source data region is complete and for which copying of the aforementioned copy destination data region is not yet complete.

A second variation of the present invention includes a processing method for copying between storage device data regions as disclosed in the first variation of the present invention, in which the aforementioned copy source data region comprises a first logical disk, the aforementioned intermediate media data region comprises a second logical disk inside an device identical to that of the aforementioned first logical disk, and the aforementioned copy destination data region comprises a third logical disk provided in a device different from the device containing the aforementioned first logical disk and the aforementioned second logical disk.

A third variation of the present invention includes a storage system including a first data region and a second data region, a storage control circuit which accesses a specified data region block in response to an access instruction, copies data in a copy source data region to an intermediate media data region for each prescribed block unit in response to a copy instruction, and copies the data copied to the intermediate media data region to a copy destination data region provided in another storage system.

Moreover, the aforementioned storage control circuit includes a copy source data updating part which updates the aforementioned access target block in the aforementioned copy source data region after copying data stored in the aforementioned access target block in the aforementioned copy source data region to the aforementioned intermediate media data region when the aforementioned access is for updating a block for which copying of the aforementioned copy source data is not yet complete. The aforementioned storage control circuit also includes a copy destination data referencing part for making a reference access to the aforementioned block for which copying of the copy destination data region is not yet complete, and a copy destination data updating part for making an update access to the aforementioned block for which copying of the copy destination region is not yet complete.

The aforementioned copy destination data reference part includes a source reference part referencing data in the aforementioned copy source data region when the aforementioned access is for referencing a block for which copying of data to the aforementioned intermediate media data region from the aforementioned copy source data region is not yet complete and for which copying of the aforementioned copy destination data region is not yet complete, and an intermediate data referencing part for referencing data in the aforementioned intermediate media data region and data in the aforementioned copy origin data region when the aforementioned access is for referencing a block for which copying of data in the aforementioned intermediate media data region from the aforementioned copy source data region is complete and for which copying of the aforementioned copy destination data region is not yet complete.

The aforementioned copy destination data updating part includes an intermediate updating part prohibiting data in the aforementioned intermediate media data region from being updated and copied from the aforementioned copy source data region to a block storing that data, and prohibiting updating of the aforementioned access target block in the aforementioned copy destination data region and copying to that block when the aforementioned access is for updating a block for which copying of data in the aforementioned intermediate media data region from the aforementioned data source data region is not yet complete and for which copying of the aforementioned copy destination data region is not yet complete. The aforementioned copy destination data updating part also includes a destination updating part prohibiting updating of the aforementioned access target block in the aforementioned copy destination data region and copying to that block when the aforementioned access is for updating a block for which copying to the aforementioned intermediate media data region from the aforementioned copy source data region is complete and for which copying of the aforementioned copy destination data region is not yet complete.

A fourth variation of the present invention includes a storage system as disclosed in the third variation of the present invention, which further includes a first logical disk comprising the aforementioned first data region and another logical disk comprising the aforementioned other data region.

A fifth variation of the present invention includes a storage system as disclosed in the third variation of the present invention and the fourth variation of the present invention, and further comprises a disk storage device that reads and writes the aforementioned data.

A sixth variation of the present invention includes a storage system as disclosed in the third variation of the present invention and the fourth variation of the present invention, and further comprises a semiconductor memory which reads and writes the aforementioned data.

A seventh variation of the present invention includes a processing method for copying between storage device data regions, comprising an initialization method for a specified target data region carried out in response to an initialization instruction. The seventh variation of the present invention further comprises initializing an initialization target region for each prescribed block unit in response to an initialization instruction, and interrupting the aforementioned initialization processing for an external access to a block in the aforementioned initialization target region during the aforementioned initialization processing and processing the aforementioned access. The processing the aforementioned access includes prohibiting updating of the aforementioned access target block in the aforementioned initialization target region for an access to update a block for which the initialization of the aforementioned initialization target region is not yet complete and copying to that block, and acknowledging initialization data established beforehand for an access to reference a block for which the initialization of the aforementioned initialization target region is not yet complete, or to reference the target block after executing the initialization of that block.

An eighth variation of the present invention includes a storage system comprising a first data region, and a storage control circuit for accessing a specified data region block in response to an access instruction and initializing an initialization target region for each prescribed block unit in response to an initialization instruction. The aforementioned storage control circuit comprises a data updating part to prohibit updating of an access target block in the aforementioned initialization target region for an access to update the aforementioned block for which initialization of the aforementioned initialization target region is not yet complete and copying to that region, and a data referencing part to acknowledge initialization data established beforehand for an access to reference a block for which the initialization of the aforementioned initialization target region is not yet complete, or to reference the target block after executing initialization of the target block.

As described above, the following effects are obtained according to the present invention.

(1) A data region such as one on a copy source logical disk is divided into a plurality of parts, copying is made by divided region unit to another data region such as on a copy destination logical disk, and if there is an access request during copying, the copy operation is interrupted, and the access request is executed, so that while copying actual data, an access request may be received, and an update or reference access to the copy source or copy destination logical disk may be carried out.

Particularly in a remote system, a performance decrease can be avoided by providing an intermediate media, and even if a breakdown occurs to a communication line between the main center and supplemental center, it is possible to retain a copy of the copy source data region in the intermediate media, so after restoring the communication line, the copy destination data region in the supplemental center can be completely reproduced based on the copy source copied data in the storage in the intermediate media.

(2) After an access target data region such as one on the copy source logical disk is copied to the copy destination logical disk, the access target region on the copy source logical disk is updated when there is an access for updating a copy incomplete data region such as one on the copy source logical disk, so it is possible to copy the data before updating when there is a copy instruction.

(3) For an access for referencing a copy incomplete region on the copy destination logical disk, the data in that region on the copy source logical disk is read, so even if it is a copy incomplete region on the copy destination logical disk, the copy data in that region can be referenced.

(4) For an access for updating a copy incomplete region on the copy destination logical disk, after the copy destination logical disk is updated with the update data, copying of that region is prohibited, so modification of the update data in that region of the copy destination logical disk is prevented.

(5) The formatting of a logical disk is done by dividing the disk into block units, and when there is an access request during formatting, the formatting operation is interrupted, and the access request is executed, so the access request can be received while executing actual formatting.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A processing method for copying between memory device data regions including a method for copying between data regions in a memory device which copies data in a copy source data region to a copy destination data region in response to a copy instruction, comprising:

a process copying the data in the copy source data region to an intermediate media data region for each prescribed block unit as well as for copying the data copied to the intermediate media data region to the copy destination data region in response to a copy instruction; and a process processing an access to a block in the copy source or the copy destination data region by a device connected to the copy source data region during the copying by interrupting the copying, said process processing the access comprising:

a process determining for each data region whether or not the access target block is one for which copying is complete, and based on this determination, a process updating the aforementioned access target block in the aforementioned copy source data region after copying data stored in the aforementioned access target block in the aforementioned copy source data region to the aforementioned intermediate media data region when the aforementioned access is for updating a block for which copying of the aforementioned copy source data region is not yet complete, a process referencing data in the copy source data region when the access is for referencing a block for which copying of data to the intermediate media data region from the copy source data region is not yet complete and for which copying of the copy destination data region is not yet complete, a process referencing data in the copy source data region or data in the intermediate media data region when the access is for referencing a block for which copying of the data in the intermediate media data region from the copy source data region is complete and for which the copying of the copy destination data region is not yet complete, a process prohibiting copying from the copy source data region to a block storing data after the data in the intermediate media data region is updated, or to prohibit updating of the access target block in the copy destination data region and copying to that block when the access is for updating a block for which copying of data in the intermediate media data region from the copy source data region is not yet complete and for which copying of the copy destination data region is not yet complete, and a process prohibiting updating of the access target block in the copy destination data region and copying to that block when the access is for updating a block for which copying to the intermediate media data region from the copy source data region is complete and for which copying of the copy destination data region is not yet complete.

2. A processing method for copying between memory device data regions recited in claim 1, wherein:

the copy source data region comprises a first logical disk, the intermediate media data region comprises a second logical disk inside a device identical to that of the first logical disk, and the copy destination data region comprises a third logical disk provided in a device different from the device containing the first logical disk and the second logical disk.

3. A memory system comprising:

a first data region and a second data region;

a memory control circuit which accesses a specified data region block in response to an access instruction, copies data in a copy source data region to an intermediate media data region for each prescribed block unit in response to a copy instruction, and copies the data copied to the intermediate media data region to a copy destination data region provided in another memory system, the memory control circuit comprising:

a copy source data updating part which updates the access target block in the copy source data region after copying data stored in the access target block in the copy source data region to the intermediate media data region when the access is for updating a block for which copying of the copy source data is not yet complete, a copy destination data referencing part for making a reference access to the block for which copying of the copy destination data region is not yet complete, and a copy destination data updating part for making an update access to the block for which copying of the copy destination region is not yet complete, the copy destination data reference part comprising:

a source reference part referencing data in the copy source data region when the access is for referencing a block for which copying of data to the intermediate media data region from the copy source data region is not yet complete and for which copying of the copy destination data region is not yet complete, and an intermediate data referencing part referencing data in the intermediate media data region and data in the copy origin data region when the access is for referencing a block for which copying of data in the intermediate media data region from the copy source data region is complete and for which copying of the copy destination data region is not yet complete; and the copy destination data updating part comprising:

an intermediate updating part prohibiting data in the intermediate media data region from being updated and copied from the copy source data region to a block storing that data, and prohibiting updating of the access target block in the copy destination data region and copying to that block when the access is for updating a block for which copying of data in the intermediate media data region from the data source data region is not yet complete and for which copying of the copy destination data region is not yet complete, and a destination updating part prohibiting updating of the access target block in the copy destination data region and copying to that block when the access is for updating a block for which copying to the intermediate media data region from the copy source data region is complete and for which copying of the copy destination data region is not yet complete.

4. A memory system recited in claim 3, comprising a first logical disk comprising the first data region and another logical disk comprising the other data region.

5. A memory system recited in claim 3 comprising a disk memory device that reads and writes the data.

6. A memory system recited in claim 3 comprising a semiconductor memory which reads and writes the data.

7. A processing method for copying between memory device data regions comprising:

an initialization method for a specified target data region carried out in response to an initialization instruction;

a process initializing an initialization target region for each prescribed block unit in response to an initialization instruction; and a process interrupting the initialization processing for an external access to a block in the initialization target region during the initialization processing and processing the access, said process interrupting comprising:

a process prohibiting updating of the access target block in the initialization target region for an access to update a block for which the initialization of the initialization target region is not yet complete and copying to that block, and a process acknowledging initialization data established beforehand for an access to reference a block for which the initialization of the initialization target region is not yet complete, or to reference the target block after executing the initialization of that block.

8. A memory system comprising:

a first data region, and a memory control circuit accessing a specified data region block in response to an access instruction and initializing an initialization target region for each prescribed block unit in response to an initialization instruction, the memory control circuit comprising:

a data updating part prohibiting updating of an access target block in the initialization target region for an access to update the block for which initialization of the initialization target region is not yet complete and copying to that region, and a data referencing part acknowledging initialization data established beforehand for an access to reference a block for which the initialization of the initialization target region is not yet complete, or to reference the target block after executing initialization of the target block.

9. A memory system recited in claim 4 comprising a disk memory device that reads and writes the data.

10. A memory system recited in claim 4 comprising a semiconductor memory which reads and writes the data.

11. A method for copying data of a computer system, said method comprising:

copying the data from a source region of a memory to an intermediate region of a memory;

copying the data from the intermediate region to a destination region of a memory; and accessing the data from one of the source region and the intermediate region if the copying of the data from the source region to the intermediate region is complete and the copying of the data from the intermediate region to the destination region is incomplete.

12. The method of claim 11, further comprising:

accessing the data from the intermediate region if the copying from the intermediate region to the destination region is complete; and accessing the data from the source region if copying the data from the intermediate region to the destination region is incomplete.

13. The method of claim 11, wherein the data is organized into data blocks, and the copying of each of the data blocks is independent of the copying of each of the other data blocks.

14. The method of claim 11, wherein the copying of the data from the intermediate region to the destination region is independent of the copying of the data from the source region to the intermediate region.

15. The method of claim 11, further comprising:

if the copying of the data from the source region to the intermediate region is complete, updating the data in the intermediate region; and if the copying of the data from the source region to the intermediate region is incomplete, completing the copying of the data from the source region to the intermediate region then updating the data in the source region.

16. The method of claim 11, further comprising accessing the data from the source region if the copying from the source region to the intermediate region is incomplete.

17. The method of claim 15, wherein access to the data is prohibited until copying is complete.

18. The method of claim 11, wherein the memory is organized into a RAID configuration.

19. The method of claim 18, wherein the source region, the intermediate region, and the destination region are stored on respective logical disks.

20. The method of claim 13, wherein a determination of whether copying is complete is made for each of the data blocks.

* * * * *